(12) United States Patent
Rondinelli et al.

(10) Patent No.: US 9,939,843 B2
(45) Date of Patent: Apr. 10, 2018

(54) APPAREL-MOUNTABLE PANORAMIC CAMERA SYSTEMS

(71) Applicant: 360fly, Inc., Fort Lauderdale, FL (US)

(72) Inventors: Michael Rondinelli, Canonsburg, PA (US); Bradley A. Simon, Eighty Four, PA (US)

(73) Assignee: 360fly, Inc., Fort Lauderdale, FL (US)

( * ) Notice: Subject to any disclaimer, the term of this patent is extended or adjusted under 35 U.S.C. 154(b) by 0 days.

(21) Appl. No.: 15/398,031

(22) Filed: Jan. 4, 2017

(65) Prior Publication Data

US 2017/0308116 A1    Oct. 26, 2017

Related U.S. Application Data

(60) Provisional application No. 62/275,070, filed on Jan. 5, 2016.

(51) Int. Cl.

| | |
|---|---|
| *G06F 1/16* | (2006.01) |
| *H04N 5/232* | (2006.01) |
| *G06F 3/01* | (2006.01) |
| *H04N 13/02* | (2006.01) |
| *H04N 5/225* | (2006.01) |
| *H04N 5/00* | (2011.01) |

(52) U.S. Cl.
CPC ............ *G06F 1/163* (2013.01); *G06F 3/011* (2013.01); *H04N 5/2258* (2013.01); *H04N 5/23206* (2013.01); *H04N 5/23229* (2013.01); *H04N 5/23238* (2013.01); *H04N 5/23296* (2013.01); *H04N 13/0239* (2013.01); *H04N 5/00* (2013.01); *H04N 2213/001* (2013.01)

(58) Field of Classification Search
None
See application file for complete search history.

(56) References Cited

U.S. PATENT DOCUMENTS

| | | | |
|---|---|---|---|
| 2012/0206565 A1* | 8/2012 | Villmer | H04N 1/00 348/36 |
| 2014/0161412 A1* | 6/2014 | Chase | H04N 21/2743 386/224 |
| 2015/0130839 A1* | 5/2015 | Kasahara | G06T 7/60 345/633 |

(Continued)

Primary Examiner — W B Perkey
(74) Attorney, Agent, or Firm — Daniel C. Crilly; Mansour Ghomeshi

(57) ABSTRACT

According to one embodiment, an apparel-mounted panoramic camera system includes a panoramic camera module, a base module, and a mounting apparatus. The camera module includes a panoramic lens having a longitudinal axis, an image sensor positioned below the lens, a processor operable to process image data received from the sensor, a wireless communication transceiver operable to transmit processed image data provided by the processor, and a battery that supplies power to the camera module components. The base module includes a wireless communication transceiver operable to receive the processed image data from the camera module communication transceiver, a processor operable to further process the received processed image data, and a battery that supplies power to the base module components. The mounting apparatus attaches the camera module to an item of apparel such that the longitudinal axis of the panoramic lens is tilted from a vertical direction by a non-zero tilt angle.

17 Claims, 23 Drawing Sheets

(56) References Cited

U.S. PATENT DOCUMENTS

| | | | |
|---|---|---|---|
| 2015/0189132 A1* | 7/2015 | Sandy | H04N 5/2252 348/376 |
| 2016/0073023 A1* | 3/2016 | Rondinelli | H04N 5/23238 348/36 |
| 2016/0127624 A1* | 5/2016 | Woo | H04N 9/3173 348/36 |
| 2017/0111578 A1* | 4/2017 | Eromaki | H04N 5/2258 |
| 2017/0176746 A1* | 6/2017 | Weller | G02B 27/0172 |

* cited by examiner

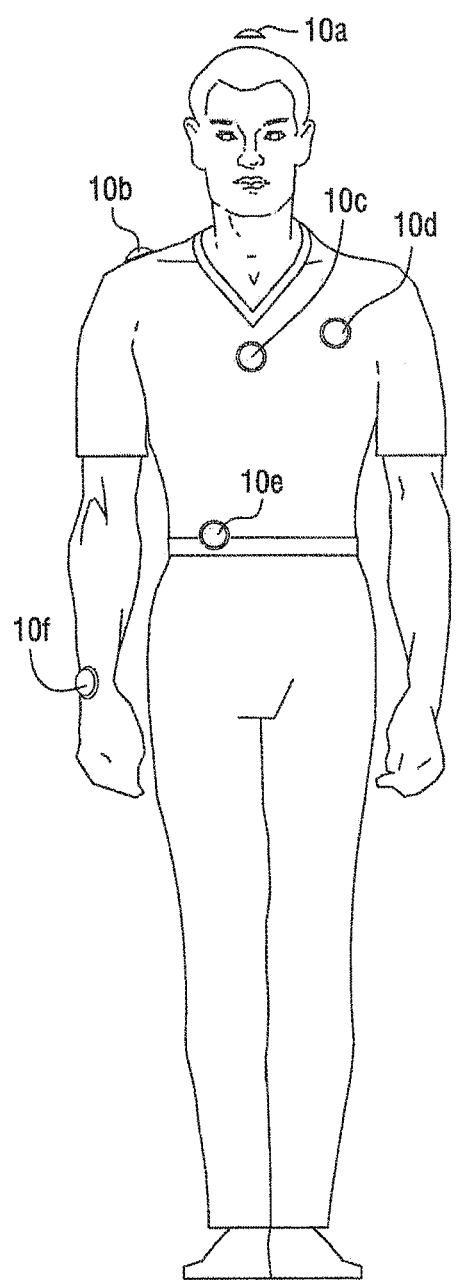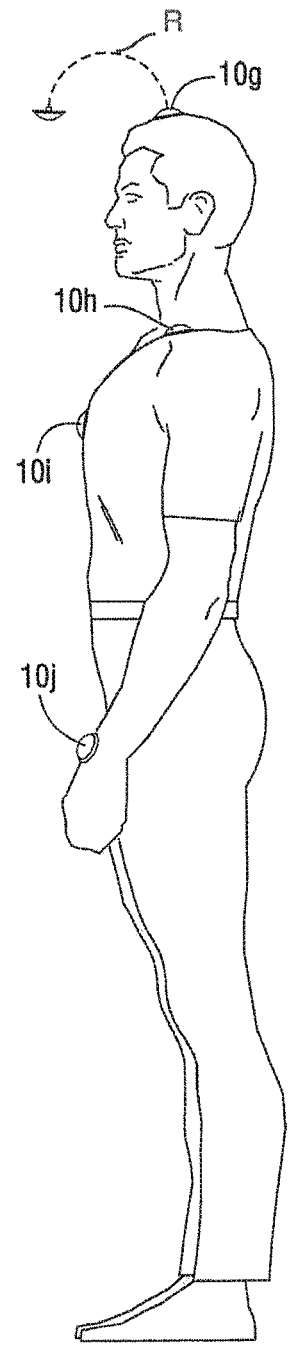
FIG. 2                    FIG. 3

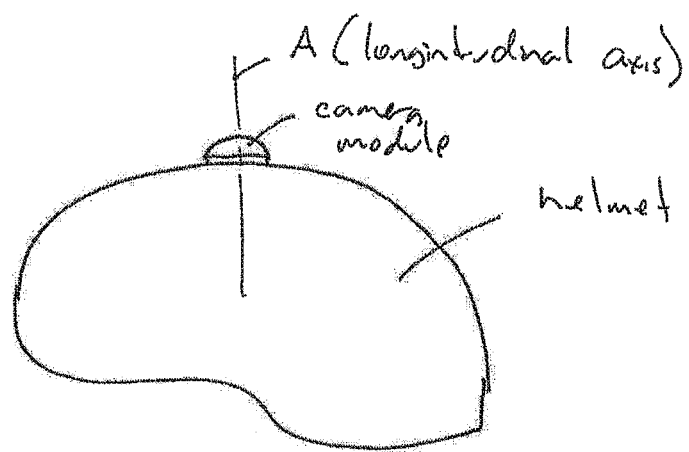
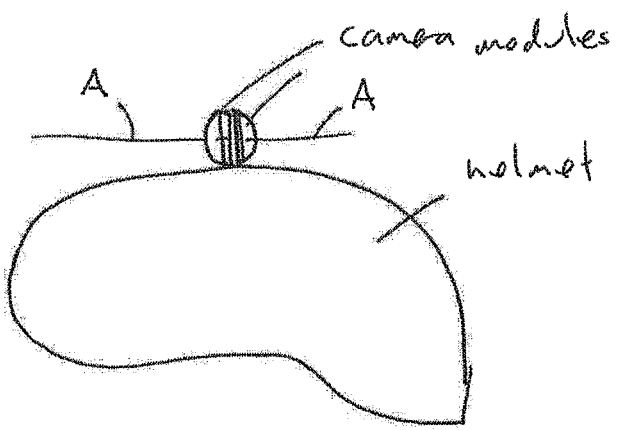
FIG. 4

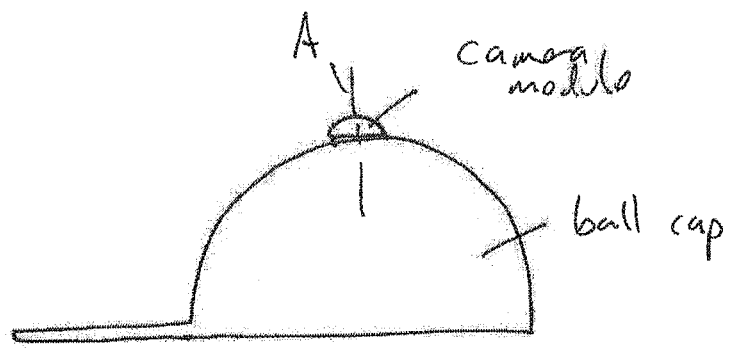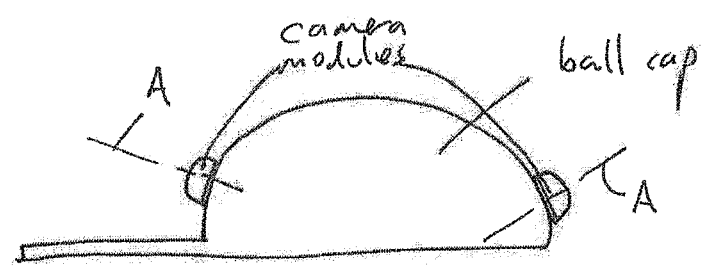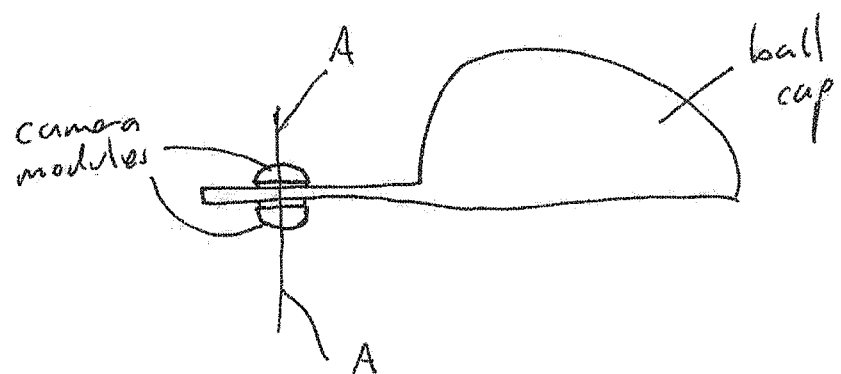
FIG. 6

APPAREL-MOUNTABLE PANORAMIC CAMERA SYSTEMS

CROSS-REFERENCE TO RELATED APPLICATIONS

The present application claims priority, under 35 U.S.C. § 119(e), upon U.S. Provisional Application No. 62/275,070, which application is incorporated herein in its entirety by this reference.

BACKGROUND

The present disclosure relates generally to panoramic imaging systems and, more particularly, to panoramic camera or imaging systems that are mountable to apparel of their users.

Panoramic imaging systems including optical devices, unwarping software, displays and various applications are disclosed in U.S. Pat. Nos. 6,963,355; 6,594,448; 7,058,239; 7,399,095; 7,139,440; 6,856,472; 7,123,777; 8,730,322; and 8,836,783; and published U.S. Patent Application Publication Nos. US2015/0002622A1; US2012/0262540A1; US2015/0234156A1; US2013/0063553A1; and US2014/0022649A1; and pending U.S. application Ser. No. 14/846,341, which are assigned to the assignee of the present application. All of these prior patents and applications are incorporated herein by reference. While such patents and publications disclose various panoramic imaging systems, they do not specifically address configurations for mounting panoramic cameras to the apparel of their users.

SUMMARY

The present disclosure relates to apparel-mountable panoramic camera systems. According to one embodiment, an apparel-mounted panoramic camera system includes a panoramic camera module, a base module, and a mounting apparatus. The panoramic camera module includes a panoramic lens having a longitudinal axis defining a 360° rotational view, an image sensor positioned below the panoramic lens, a first processor coupled to the image sensor and operable to process image data received from the image sensor, a first wireless communication transceiver coupled to the processor and operable to transmit processed image data provided by the first processor, and an optional first battery that supplies power to at least the image sensor, the first processor, and the first wireless communication transceiver. The base module includes a second wireless communication transceiver operable to receive the processed image data from the first wireless communication transceiver, a second processor coupled to the second wireless communication transceiver and operable to further process the processed image data received by the second wireless communication transceiver, and a second battery that supplies power to at least the second processor and the second wireless communication transceiver (and may also supply power to the components of the panoramic camera module through a wire, cable, or other conventional means). The mounting apparatus attaches the panoramic camera module to an item of apparel such that the longitudinal axis of the panoramic lens is tilted from a vertical direction by a non-zero tilt angle. In one preferred embodiment, the non-zero tilt angle is chosen to enable the longitudinal axis of the panoramic lens to be vertical or nearly vertical when the item of apparel, such as a helmet or cap, is worn or used by a user.

According to an alternative embodiment, the first processor receives raw image data from the image sensor, performs a tiling process on the raw image data to produce tiled image data, encodes the tiled image data, and provides the encoded tiled image data to the first wireless communication transceiver for transmission to the second wireless communication transceiver. In such a case, the second processor may receive the encoded tiled image data, decode the encoded tiled image data to produce the tiled image data, de-tile the tiled image data to produce the raw image data, and format the raw image data for presentation on a display.

According to a further embodiment, an apparel-mounted panoramic camera system includes two panoramic camera modules, a base module, a wireless communication transceiver, and a mounting apparatus. The first panoramic camera module includes a first panoramic lens having a longitudinal axis defining a 360° rotational view, a first image sensor positioned below the first panoramic lens, a first processor coupled to the first image sensor and operable to process image data received from the first image sensor, and an optional first battery that supplies power to at least the first image sensor and the first processor. The second panoramic camera module includes a second panoramic lens having a longitudinal axis defining a 360° rotational view, a second image sensor positioned below the second panoramic lens, a second processor coupled to the second image sensor and operable to process image data received from the second image sensor, and an optional second battery that supplies power to at least the second image sensor and the second processor. The second panoramic camera module is positioned in a direction opposite to the first panoramic camera module such that the longitudinal axes of the first panoramic lens and the second panoramic lens are substantially aligned. The wireless communication transceiver is coupled to the first processor and the second processor, and operable to transmit processed image data provided by the first processor and the second processor. The base module includes a second wireless communication transceiver operable to receive the processed image data from the transmitting wireless communication transceiver, a third processor coupled to the second wireless communication transceiver and operable to further process the processed image data received by the second wireless communication transceiver, and a second battery that supplies power to at least the third processor and the second wireless communication transceiver (and may also supply power to the components of the panoramic camera modules through one or more wires, cables, or other conventional means). The mounting apparatus attaches the panoramic camera modules to an item of apparel such that the substantially-aligned longitudinal axes of the panoramic lenses are tilted from a horizontal direction by a non-zero tilt angle. In one preferred embodiment, the non-zero tilt angle is chosen to enable the longitudinal axis of the panoramic lens to be horizontal or nearly horizontal when the item of apparel, such as a helmet or cap, is worn or used by a user.

According to alternative embodiment involving the dual panoramic camera module system, the first processor receives first raw image data from the first image sensor, performs a tiling process on the first raw image data to produce first tiled image data, encodes the first tiled image data, and provides the encoded first tiled image data to the wireless communication transceiver for transmission to the second wireless communication transceiver. Additionally, the second processor receives second raw image data from the second image sensor, performs a tiling process on the second raw image data to produce second tiled image data, encodes the second tiled image data, and provides the encoded second tiled image data to the wireless communication transceiver for transmission to the second wireless communication transceiver. In such a case, the third processor may receive the encoded first tiled image data and the encoded second tiled image data, decode the encoded first tiled image data and the encoded second tiled image data to produce the first tiled image data and the second tiled image data, de-tile the first tiled image data and the second tiled image data to produce the first raw image data and the second raw image data, stitch the first raw image data and the second raw image data together to form a full 360°×360° field of view, and format the stitched raw image data for presentation on a display.

BRIEF DESCRIPTION OF THE DRAWINGS

FIG. 2 schematically illustrates a panoramic camera module mounted at various locations in relation to a user's body, in accordance with exemplary embodiments of the present disclosure.

FIG. 3 schematically illustrates a panoramic camera module mounted at various alternative locations in relation to a user's body, in accordance with additional exemplary embodiments of the present disclosure.

FIG. 4 schematically illustrates various mounting arrangements for one or more panoramic camera modules on a helmet, in accordance with additional exemplary embodiments of the present disclosure.

FIG. 6 schematically illustrates panoramic camera modules mounted at various locations on a ball cap, in accordance with further exemplary embodiments of the present disclosure.

DETAILED DESCRIPTION

The present invention provides a modular panoramic camera system comprising at least one camera module comprising a panoramic lens and a base module that may be physically separate from the panoramic camera module.

Figure 1:
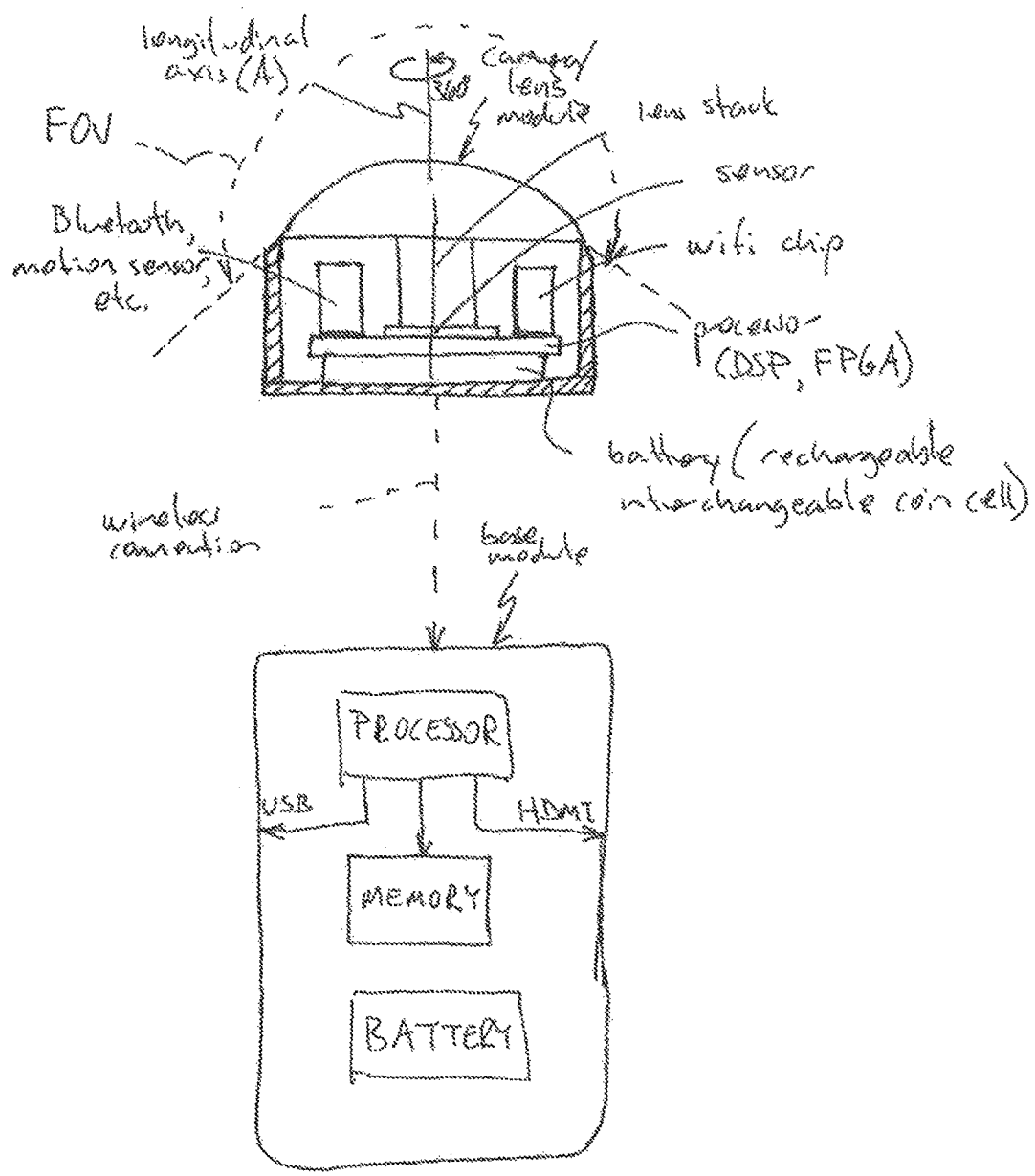
FIG. 1 illustrates a block diagram of an apparel-mountable camera system in accordance with one exemplary embodiment of the present disclosure.

FIG. 1 illustrates an embodiment of the present invention. The system 100 includes a panoramic camera module 101 and a base module 102, which may be physically separated from each other, but in communication with each other (e.g., through a wireless connection as shown by the dashed line in FIG. 1, by a hard-wired connection, or by any other suitable connection means).

As shown in FIG. 1, the panoramic camera module 101 includes a panoramic lens including an uppermost curved lens element and an underlying lens stack comprising a series of lens elements, as more fully described below. A video sensor is positioned below the lens stack. A processor is located beneath the sensor. The processor may be any suitable processor, such as a central processing unit (CPU), a digital signal processor (DSP), a field-programmable gate array (FPGA), and the like. A battery, such as a rechargeable cell, may be located under the processor. As shown in FIG. 1, the lens stack, sensor, processor and battery are contained within a camera housing. Communication means, such as a Wi-Fi chip and/or a Bluetooth chip, may be contained in the housing (e.g., connected to the processor as shown in FIG. 1). Such communication means provide a communication link between the panoramic camera module 101 and the base module 102 for transferring video image data, as well as audio data and/or motion sensor data, from the panoramic camera module 101 to the base module 102. At least one microphone may be provided on or inside the camera housing. At least one motion sensor may be provided inside the camera housing (e.g., connected to the processor).

As shown in FIG. 1, the panoramic lens has a principle longitudinal axis (optical axis) A defining a 360° rotational view. In FIG. 1, the longitudinal axis A is vertical and the panoramic lens is oriented to provide a 360° rotational view along a horizontal plane perpendicular to the longitudinal axis A. However, the camera system 100 and panoramic lens may be oriented in any other desired orientation during use. As further shown in FIG. 1, the panoramic lens also has a field of view FOV, which, in the orientation shown in FIG. 1, corresponds to a vertical field of view. In certain embodiments, the field of view FOV is greater than 180° up to 360° (e.g., from 200° to 300°, from 210° to 280°, or from 220° to 270°). In certain embodiments, the field of view FOV may be about 230°, 240°, 250°, 260° or 270°.

As further shown in FIG. 1, the base module 102 may include a main processor connected to a memory or data storage device. In certain embodiments, the base module 102 may be a smart phone or similar type of device. Communication and data connections may be made via the base module 102 (e.g., a USB data connection, HDMI connection, CPU connection and the like). A battery may be included in the base module 102. The base module battery may be rechargeable and interchangeable, and may be connectable with the battery of the camera module 101 (e.g., by a wire connection or similar type of hard wire connection when the camera module 101 is connected or docked to the base module 102).

FIGS. 2 and 3 schematically illustrate a panoramic camera module 101 as described herein mounted at various locations in relation to a user's body. In FIG. 2, the panoramic camera module is shown: above the user's head 10a; on the user's shoulder 10b; in the center of the user's chest 10c; on the side of the user's chest 10d; on the user's belt 10e, and on the user's wrist 10f. In FIG. 3, the panoramic camera module is shown: on the user's head 10g; on the user's shoulder 10h; on the user's chest 10i; and on the user's wrist 10j. As shown in FIG. 3, the panoramic camera 10g may be flipped, pivoted along a rotational path R, or extended by any suitable mounting bracket or device, from a position above the user's head 10g to an extended position 10g in which the user's face will be within the field of view of the panoramic camera 10g. Similar pivoting/extension movements may be used when the panoramic camera module is positioned at other locations on the user, utilizing any suitable mounting brackets or devices that would be apparent to those skilled in the art.

In addition to the locations shown in FIGS. 2 and 3, the panoramic cameras of the present invention may be positioned at any other location with respect to the user. Furthermore, when the panoramic camera module is positioned at a specific location, the orientation of the panoramic camera may be adjusted as desired. For example, while the head-mounted cameras 10a and 10g shown in FIGS. 2 and 3 are oriented with their longitudinal axes pointing vertically upward, the cameras could be turned to any desired position (e.g., 90°, 180°, etc.). Any suitable means of attachment to the user's body, clothing, headgear, etc. may be used, such as clips, mechanical fasteners, magnets, hook-and-loop fasteners, straps, adhesives, and the like. For head-mounted uses, any suitable structure may be used to support the camera (e.g., helmets, caps, head bands, and the like). For example, the camera may be mounted on or in various types of sports helmets, recreational helmets, cycling helmets, protective helmets, baseball caps, and the like.

In certain embodiments, the orientation of the longitudinal axis A of the panoramic lens may be controlled when the panoramic camera is mounted on a helmet, apparel, or other support structure or bracket. For example, when the panoramic camera is mounted on a helmet, the orientation of the panoramic camera in relation to the helmet may be controlled to provide a desired tilt angle when the wearer's head is in a typical position during use of the camera, such as when a motorcyclist or bicyclist is riding, a skier is skiing, a hockey player is skating, etc. An example of such tilt angle control is schematically illustrated in FIG. 3, in which the panoramic camera 10g is oriented in relation to the user's head such that the longitudinal axis A is tilted from the vertical direction, V, at a tilt angle, T, when the user's head is in a particular position. In certain embodiments, the tilt angle may range from +90° to −90°, or from +45° to −45°, or from +30° to −30°, or from +20° to −20°, or from +10° to −10°. For example, as shown in FIG. 3, the tilt angle may be forward facing, and may range from 0° to 90° or more (e.g., from 1° to 30°, or from 2° to 20°, or from 3° to 15°, or from 5° to 10°).

In accordance with embodiments of the invention, the orientation of the panoramic camera module and its field of view may be key elements to capture certain portions of an experience, such as riding a bicycle or motorcycle, skiing, surfing, etc. For example, the camera may be moved toward the front of the user's head to capture the steering wheel of a bicycle or motorcycle, while at the same capturing the back view of the riding experience. From the user's perspective in relationship to a horizon line, the camera can be oriented slightly forward (e.g., with its longitudinal axis A tilted forward at from 5° to 10° or more, as described above).

FIG. 4 schematically illustrates various mounting arrangements of panoramic camera module(s) on a helmet. In one embodiment, a single panoramic camera module is mounted at or near the top of the helmet with its longitudinal axis (optical axis) A in a vertical direction. In another embodiment, two panoramic camera modules are mounted back-to-back with their longitudinal axes aligned in a substantially horizontal direction. When multiple panoramic camera modules are used, the image data from the cameras may be stitched together to provide a full 360°×360° field of view.

Figure 5:
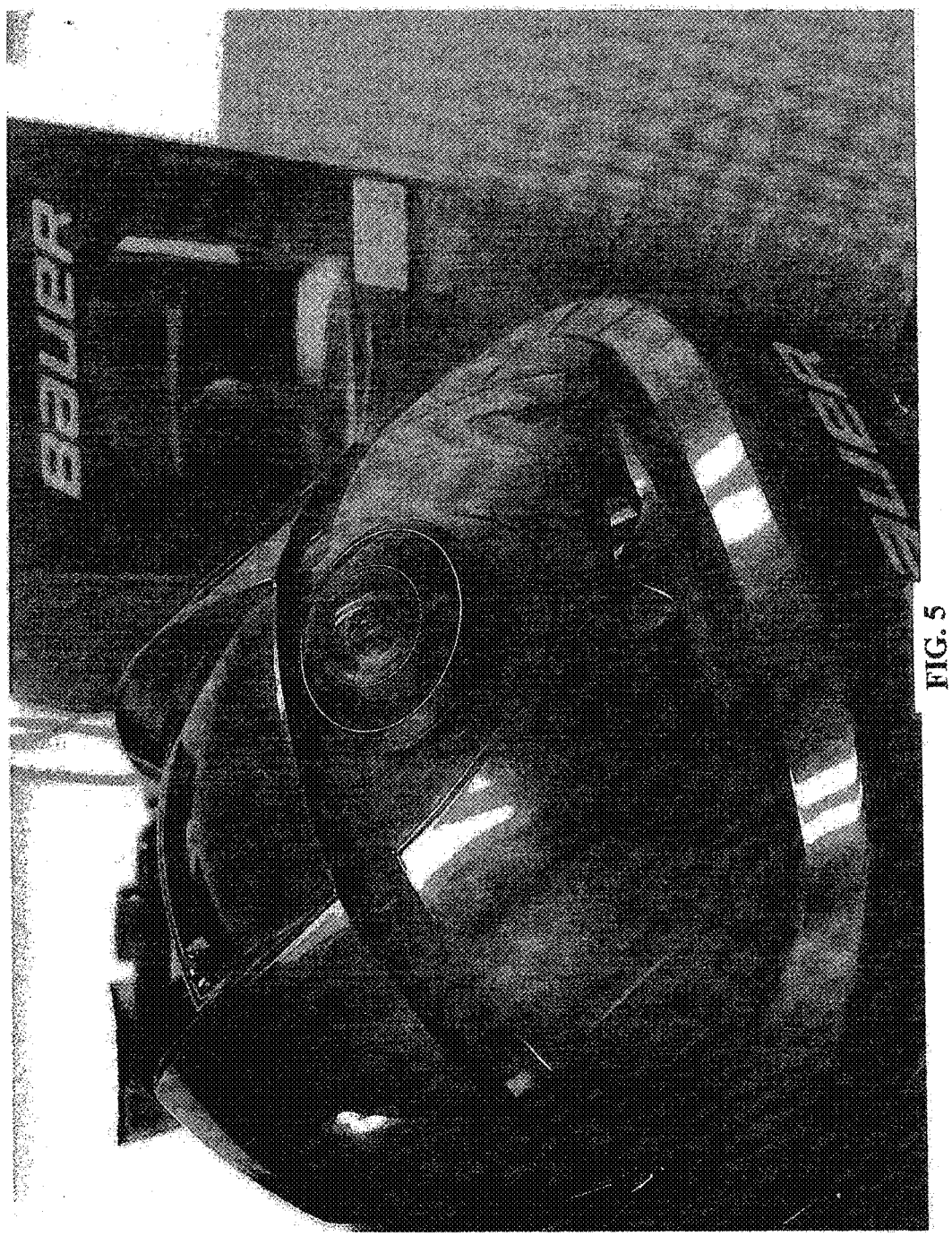
FIG. 5 illustrates a panoramic camera module mounted on a hockey helmet, in accordance with another exemplary embodiment of the present disclosure.

FIG. 5 is a photograph illustrating a panoramic camera module mounted on a hockey helmet. In the embodiment shown, the longitudinal axis of the camera lens may be tilted slightly forward from vertical in order to capture an increased field of view in front of the wearer in comparison with behind the wearer.

FIG. 6 schematically illustrates panoramic camera modules mounted at various locations on a ball cap. In one embodiment, the panoramic camera module is mounted with its longitudinal axis A in a substantially vertical orientation. In another embodiment, two panoramic camera modules are mounted near the front and back of the cap with their longitudinal axes oriented at angles between vertical and horizontal. In a further embodiment, two opposing panoramic camera modules are mounted above and below the bill of the ball cap with their longitudinal axes substantially aligned in a vertical direction. When multiple panoramic camera modules are used, the image data from the cameras may be stitched together to provide a full 360°×360° field of view.

Figure 7:
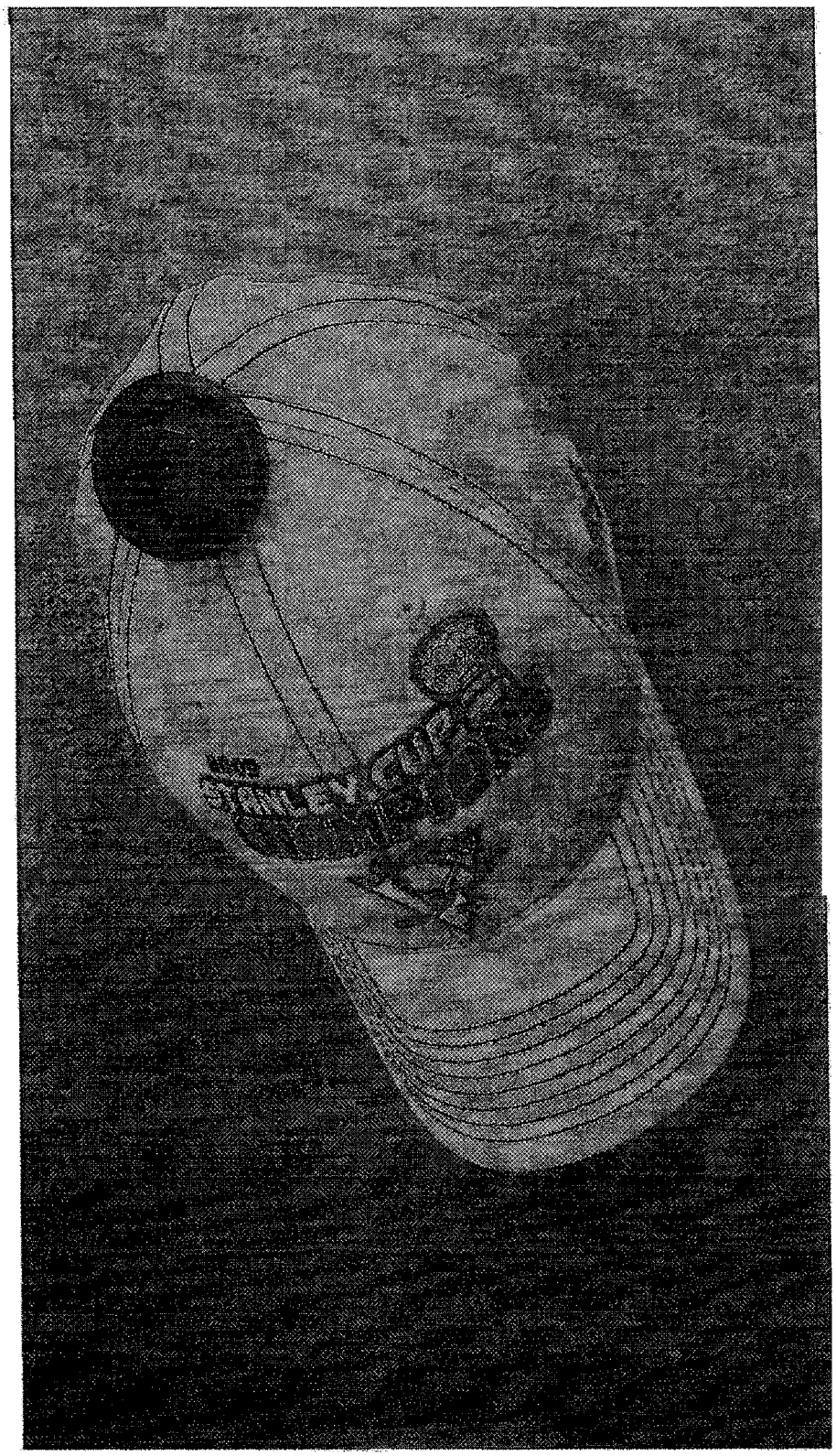
FIGS. 7 and 8 illustrate mounting of a panoramic camera module on or near the top of a ball cap, in accordance with another exemplary embodiment of the present disclosure.
Figure 8:
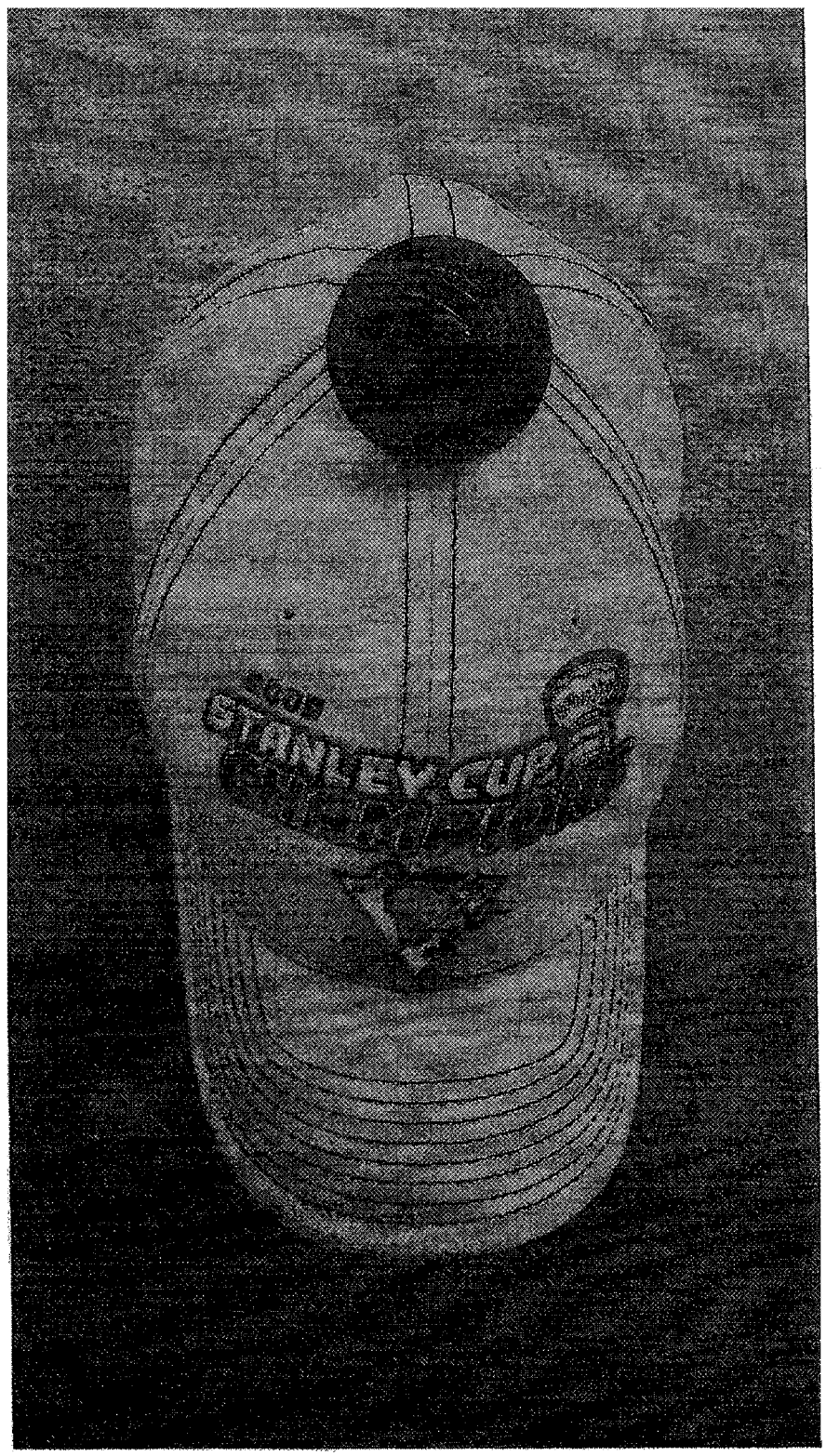

FIGS. 7 and 8 illustrate the exemplary mounting of a panoramic camera module near the top of a ball cap.

Figure 9:
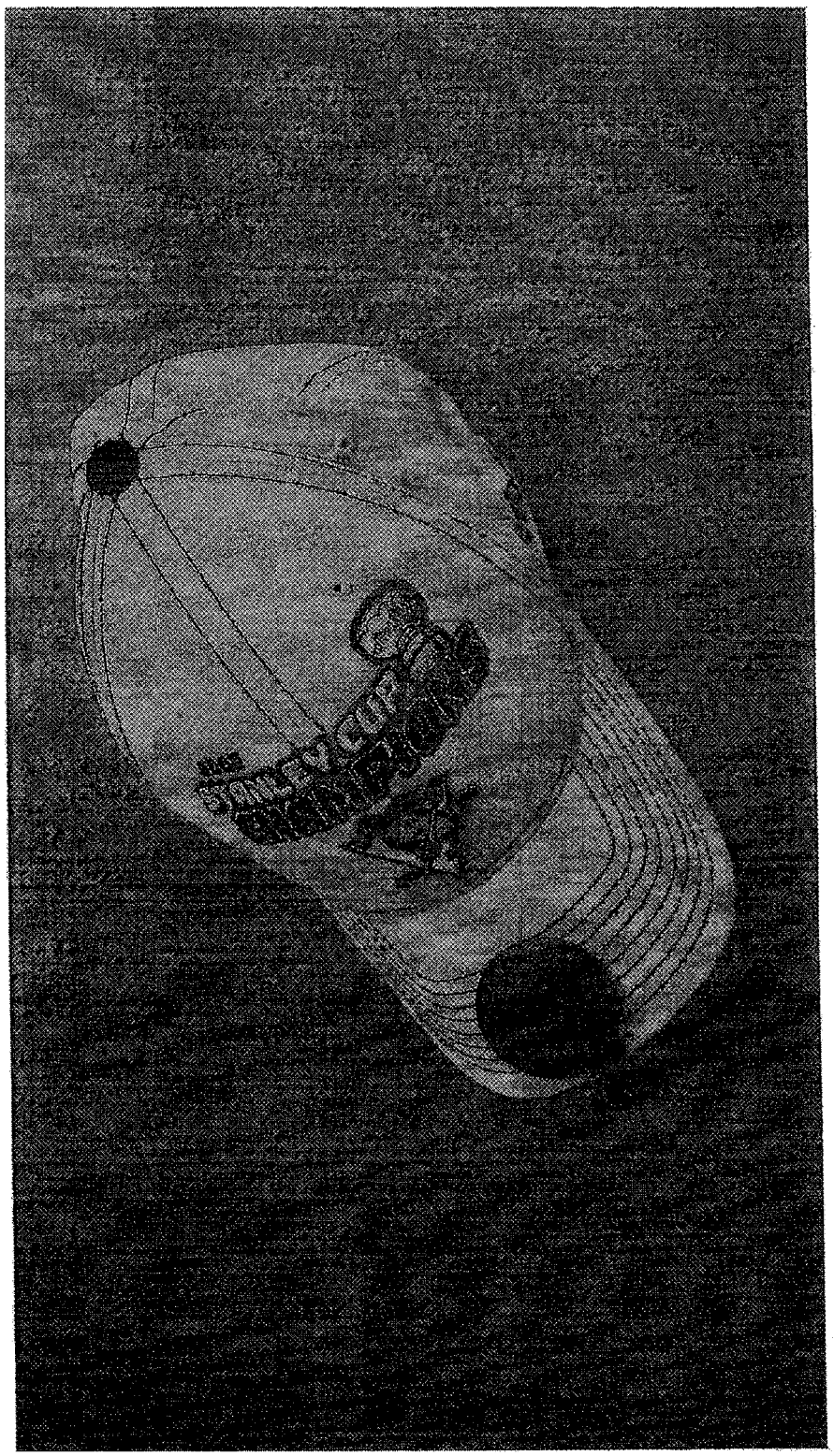
FIGS. 9 and 10 illustrate mounting of a panoramic camera module on top of the bill of a ball cap, in accordance with yet another exemplary embodiment of the present disclosure.
Figure 10:
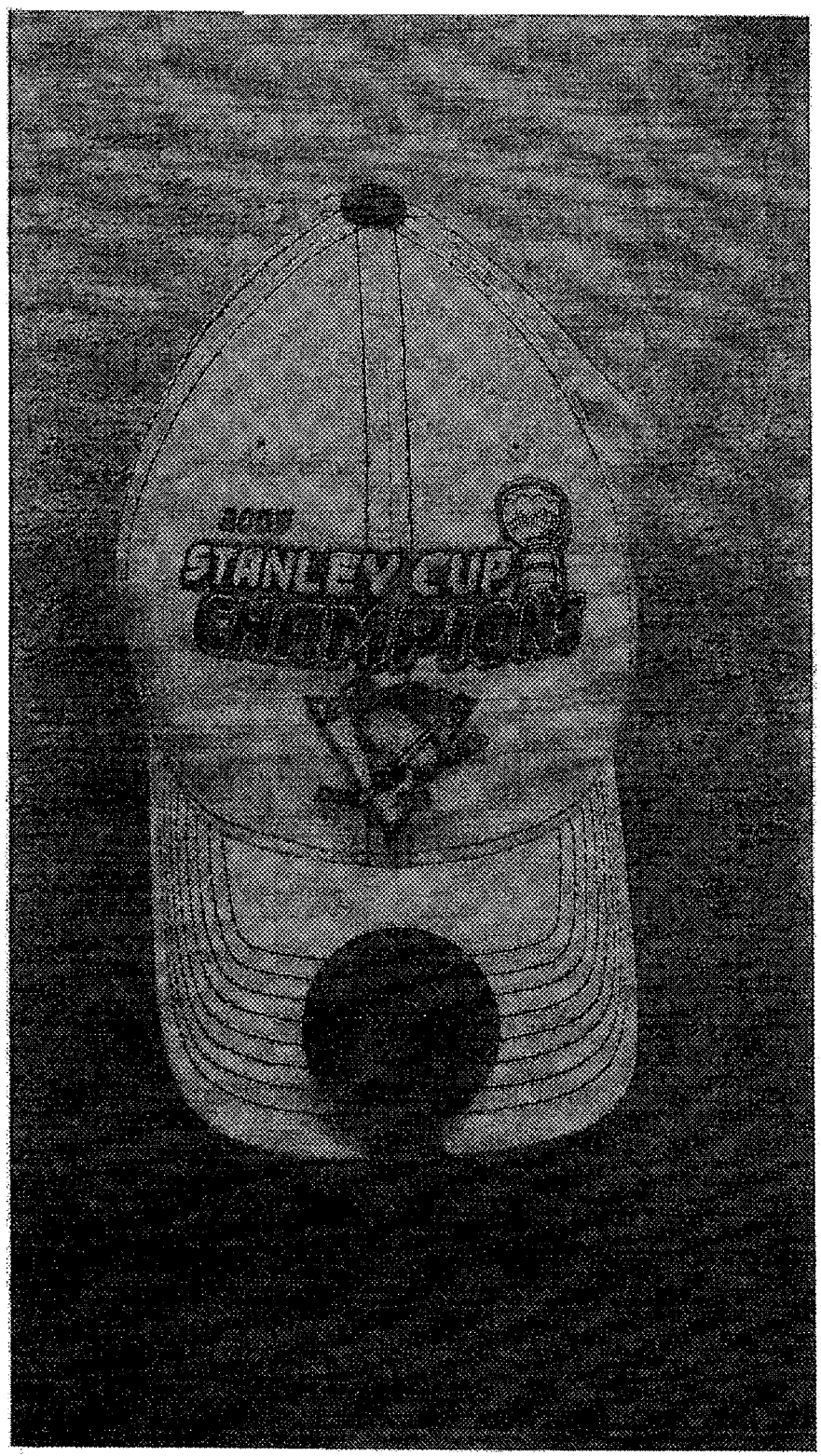

FIGS. 9 and 10 illustrate the exemplary mounting of a panoramic camera module on top of the bill of a ball cap.

The panoramic camera modules of the present invention (e.g., as described in FIGS. 1-10 above) may be located at any desired position(s) on or near a user in order to capture various types of panoramic video images. Furthermore, the panoramic camera modules may be mounted on any suitable support structure, such as vehicles, aircraft, drones, watercraft and the like. For example, a single panoramic camera module may be mounted on the underside of a drone with its longitudinal axis pointing downward or in any other desired direction. Multiple panoramic camera modules may be mounted on vehicles, aircraft, drones, watercraft and other support structures. For example, two panoramic camera modules may be mounted on a drone with their longitudinal axes aligned (e.g., with the longitudinal axis of one camera module pointing vertically downward and the longitudinal axis of the other camera module pointing vertically upward, or with the camera modules' longitudinal axes pointing in any other desired directions such as horizontal, etc.). For such vehicle-mounted applications, functionality, such as optical avoidance, tracking and navigation, may be provided.

In certain embodiments, the panoramic camera module 101 may also capture sound (e.g., by the use of at least one-board microphone). Furthermore, the panoramic camera module may contain at least one motion sensor, such as an accelerometer, gyroscope, or the like. In addition, the panoramic camera module may have communication capabilities, such as RF, Bluetooth, Wi-Fi and the like, as described above. In alternative embodiments, one or more of such microphones, motion sensors, and communication means may be provided in the base module 102.

In certain embodiments, the panoramic camera module contains a relatively small rechargeable battery, such as a lithium coin cell battery, while a larger battery may be provided at a remote location from the panoramic camera module. For example, for helmet-mounted panoramic camera modules, a remote battery may be provided at a different location on or in the helmet than the location of the panoramic camera module, or a remote battery may be provided in a smart phone carried by the user. For apparel-mounted panoramic camera modules, a remote battery may be worn in the pocket of the user or provided in a smart phone carried by the user. Electrical connections may be made between the batteries by any suitable means, such as a disconnectable wire or the like.

In certain embodiments, the base module 102 may comprise a smart phone or similar device equipped with features that support the panoramic camera module. For example, a smart phone base unit may include at least one processor, memory, USB connector(s), Wi-Fi transceiver(s), Bluetooth transceiver, and the like. The smart phone base unit may include at least one microphone for capturing sound during operation of the panoramic camera module 101. The smart phone base unit may include at least one motion sensor for capturing motion data during operation of the panoramic camera unit. The smart phone base unit may also include a rechargeable battery that may optionally be used to recharge the battery contained in the panoramic camera module.

The image sensor of the panoramic camera module 101 may comprise any suitable type of conventional sensor, such as CMOS or CCD imagers, or the like. For example, the image sensor may be a high resolution sensor sold under the designation IMX117 by Sony Corporation. In certain embodiments, video data from certain regions of the sensor may be eliminated prior to transmission. For example, the corners of an image sensor having a rectangular (e.g., square) surface area may be eliminated because they may not include useful image data from the circular image produced by the panoramic lens assembly, and/or image data from a side portion of a rectangular sensor may be eliminated in a region where the circular panoramic image is not present. In certain embodiments, the image sensor may include an on-board or separate encoder. For example, the raw sensor data may be compressed prior to transmission (e.g., using conventional encoders, such as jpeg, H.264, H.265, and the like). In certain embodiments, the image sensor may support three stream outputs such as: recording H.264 encoded .mp4 (e.g., image size 1504×1504); RTSP stream (e.g., image size 750×750); and snapshot (e.g., image size 1504×1504). However, any other desired number of image streams, and any other desired image size for each image stream, may be used.

A tiling and de-tiling process may be used in accordance with the present invention. Tiling is a process of chopping up a circular image of the sensor produced from the panoramic lens into pre-defined chunks to optimize the image for encoding and decoding for display without loss of image quality (e.g., as a 1080p image on certain mobile platforms and common displays). The tiling process may provide a robust, repeatable method to make panoramic video universally compatible with display technology while maintaining high video image quality. Tiling may be performed in the base module and/or in the panoramic camera module, or elsewhere. Tiling may be used on any or all of the image streams. The tiling may be done after the raw video is presented, then the file may be encoded with an industry standard H.264 encoding or the like. The encoded streams can then be decoded by an industry standard decoder on the user side. The image may be decoded and then de-tiled before presentation to the user. The de-tiling can be optimized during the presentation process depending on the display that is being used as the output display. The tiling and de-tiling process may preserve high quality panoramic images and optimize resolution, while minimizing processing required on both the camera side and on the user side for lowest possible battery consumption and low latency. The image may be de-warped through the use of de-warping software or firmware after the de-tiling reassembles the image. The de-warped image may be manipulated by an app, as more fully described below.

Communication board(s), such as a Wi-Fi board and Bluetooth board, may be attached to the processor. Additional functions may be added to such boards, such as cellular communication and motion sensor functions, which are more fully described below.

The processor of the panoramic camera module 101, or the processor of the base module 102, may function as the command and control center of the camera system to control the video processing, data storage, and wireless or other communication command and control. Video processing may comprise encoding video using industry standard H.264 profiles or the like to provide natural image flow with a standard file format. Decoding video for editing purposes may also be performed. Data storage may be accomplished by writing data files to an SD memory card or the like, and maintaining a library system. Data files may be read from the SD card for preview and transmission. Wireless command and control may be provided. For example, Bluetooth commands may include processing and directing actions of the camera received from a Bluetooth radio and sending responses to the Bluetooth radio for transmission to the camera. Wi-Fi radio may also be used for transmitting and receiving data and video. Such Bluetooth and Wi-Fi functions may be performed with the separate boards or with a single board. Cellular communication may also be provided (e.g., with a separate board, or in combination with any of the boards described above).

The camera system may include one or more motion sensors (e.g., as part of the processor in the panoramic camera module 101 and/or in the base module 102). As used herein, the term "motion sensor" includes sensors that can detect motion, orientation, position, impact and/or location, including linear motion and/or acceleration, rotational motion and/or acceleration, orientation of the camera system (e.g., pitch, yaw, tilt), geographic position, gravity vector, altitude, height, and the like. For example, the motion sensor(s) may include accelerometers, gyroscopes, global positioning system (GPS) sensors, barometers and/or compasses that produce data simultaneously with the optical and, optionally, audio data. Such motion sensors can be used to provide the motion, orientation, position and location information used to perform some of the image processing and display functions described herein. This data may be encoded and recorded. The captured motion sensor data may be synchronized with the panoramic visual images captured by the camera system, and may be associated with a particular image view corresponding to a portion of the panoramic visual images, for example, as described in U.S. Pat. Nos. 8,730,322 and 8,836,783.

Orientation-based tilt can be derived from accelerometer data. This can be accomplished by computing the live gravity vector relative to the camera system. The angle of the gravity vector in relation to the device along the device's display plane will match the tilt angle of the device. This tilt data can be mapped against tilt data in the recorded media. In cases where recorded tilt data is not available, an arbitrary horizon value can be mapped onto the recorded media. The tilt of the device may be used to either directly specify the tilt angle for rendering (i.e., holding the device vertically may center the view on the horizon), or it may be used with an arbitrary offset for the convenience of the operator. This offset may be determined based on the initial orientation of the device when playback begins (e.g., the angular position of the device when playback is started can be centered on the horizon).

Any suitable accelerometer may be used, such as conventional 3-axis and 9-axis accelerometers. For example, a 3 axis BMA250 accelerometer from BOSCH or the like may be used. A 3-axis accelerometer may enhance the capability of the camera to determine its orientation in 3D space using an appropriate algorithm. The camera system 10 may capture and embed the raw accelerometer data into the metadata path in a MPEG4 transport stream, providing the full capability of the information from the accelerometer that provides the user side with details to orient the image to the horizon.

The motion sensor may comprise a GPS sensor capable of receiving satellite transmissions (e.g., the system can retrieve position information from GPS data). Absolute yaw orientation can be retrieved from compass data, acceleration due to gravity may be determined through a 3-axis accelerometer when the computing device is at rest, and changes in pitch, roll and yaw can be determined from gyroscope data. Velocity can be determined from GPS coordinates and timestamps from the software platform's clock. Finer precision values can be achieved by incorporating the results of integrating acceleration data over time. The motion sensor data can be further combined using a fusion method that blends only the required elements of the motion sensor data into a single metadata stream or in future multiple metadata streams.

The motion sensor may comprise a gyroscope which measures changes in rotation along multiple axes over time, and can be integrated over time intervals (e.g., between the previous rendered frame and the current frame). For example, the total change in orientation can be added to the orientation used to render the previous frame to determine the new orientation used to render the current frame. In cases where both gyroscope and accelerometer data are available, gyroscope data can be synchronized to the gravity vector periodically or as a one-time initial offset. Automatic roll correction can be computed as the angle between the device's vertical display axis and the gravity vector from the device's accelerometer.

Any suitable type of microphone may be provided inside the panoramic camera module 101 and/or in the base module 102 (e.g., near a microphone hole) to detect sound. One or more microphones may be used inside and/or outside the camera or base modules. In addition to an internal microphone(s), at least one microphone may be mounted on the camera system and/or positioned remotely from the system. In the event that multiple channels of audio data are recorded from a plurality of microphones in a known orientation, the audio field may be rotated during playback to synchronize spatially with the interactive renderer display. The microphone output may be stored in an audio buffer and compressed before being recorded. In the event that multiple channels of audio data are recorded from a plurality of microphones in a known orientation, the audio field may be rotated during playback to synchronize spatially with the corresponding portion of the video image.

In accordance with embodiments of the present invention, the panoramic lens may comprise transmissive hyper-fisheye lenses with multiple transmissive elements (e.g., dioptric systems); reflective mirror systems (e.g., panoramic mirrors as disclosed in U.S. Pat. Nos. 6,856,472; 7,058,239; and 7,123,777, which are incorporated herein by reference); or catadioptric systems comprising combinations of transmissive lens(es) and mirror(s). In certain embodiments, the panoramic lens 30 comprises various types of transmissive dioptric hyper-fisheye lenses. Such lenses may have fields of view (FOVs) as described above, and may be designed with suitable F-stop speeds. F-stop speeds may typically range from f/1 to f/8, for example, from f/1.2 to f/3. As a particular example, the F-stop speed may be about f/2.5. Examples of panoramic lenses that may be used in the panoramic camera module 101 are schematically illustrated in FIGS. 11-14.

Figure 11:
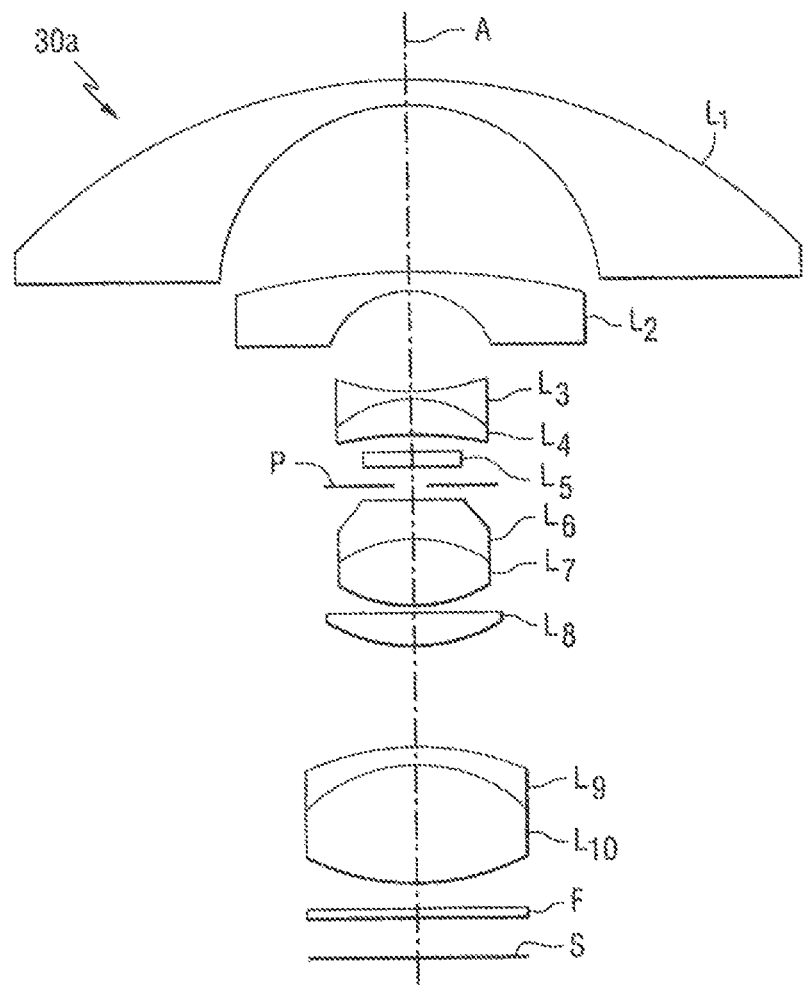
FIG. 11 schematically illustrates an exemplary panoramic lens system for use in a panoramic camera module, in accordance with a further exemplary embodiment of the present disclosure.
Figure 12:
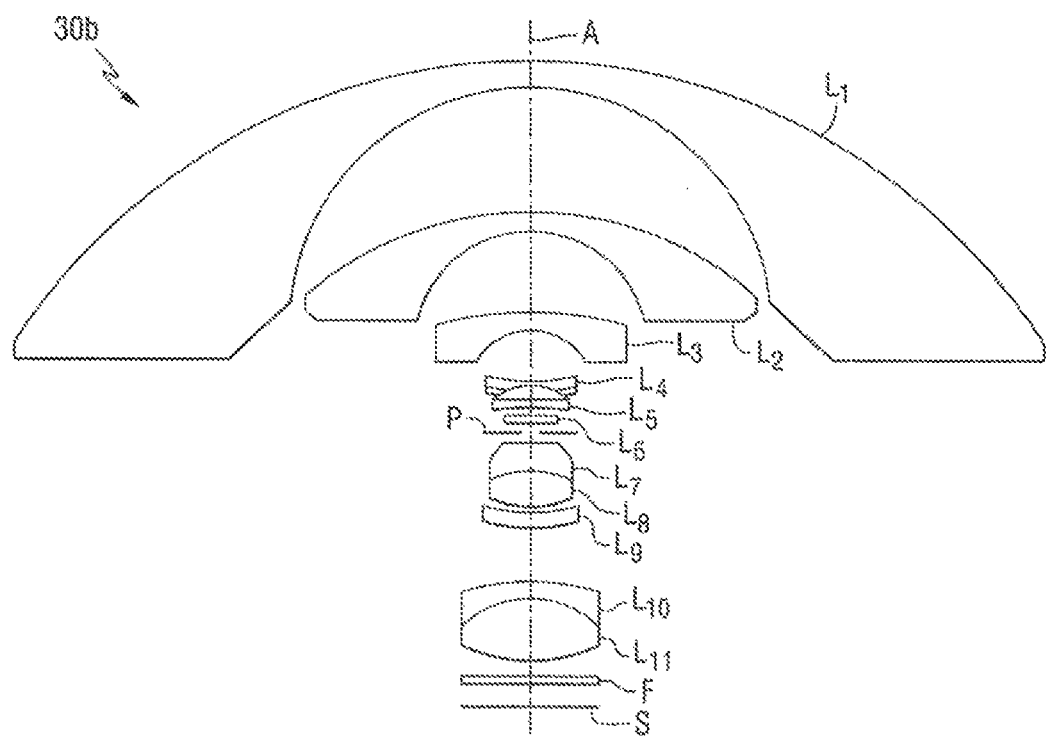
FIG. 12 schematically illustrates an alternative exemplary panoramic lens system for use in a panoramic camera module, in accordance with another exemplary embodiment of the present disclosure.

FIGS. 11 and 12 schematically illustrate panoramic lens systems 30a and 30b similar to those disclosed in U.S. Pat. No. 3,524,697, which is incorporated herein by reference. The panoramic lens system 30a shown in FIG. 11 has a longitudinal axis A and comprises ten lens elements $L_1$-$L_{10}$. In addition, the panoramic lens system 30a includes a plate P with a central aperture, and may be used with a filter F and image sensor S. The filter F may comprise any conventional filter(s), such as infrared (IR) filters and the like. The panoramic lens system 30b shown in FIG. 12 has a longitudinal axis A and comprises eleven lens elements $L_1$-$L_{11}$. In addition, the panoramic lens system 30b includes a plate P with a central aperture, and is used in conjunction with a filter F and an image sensor S.

Figure 13:
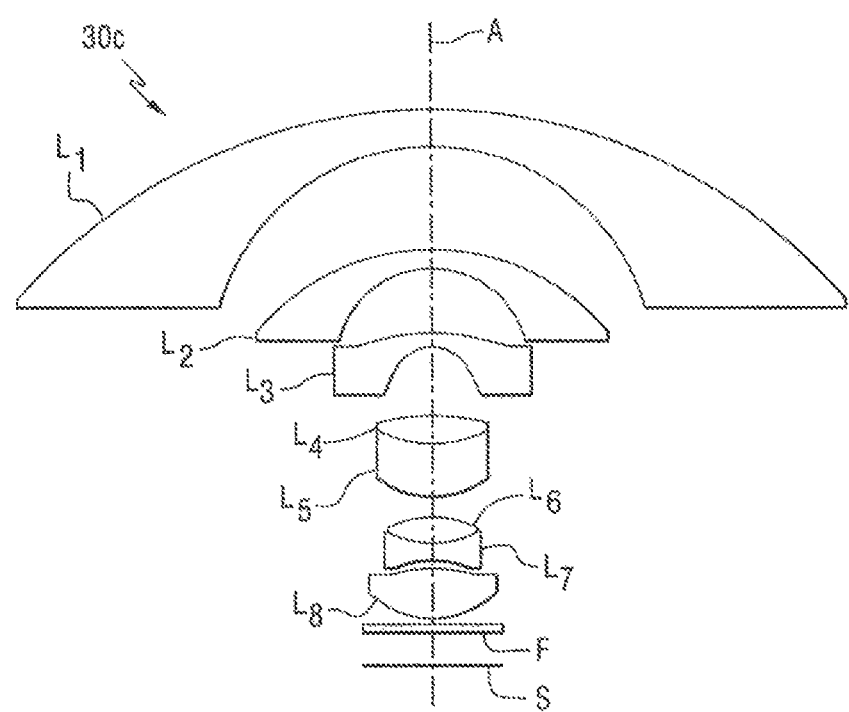
FIG. 13 schematically illustrates yet another exemplary panoramic lens system for use in a panoramic camera module, in accordance with a further exemplary embodiment of the present disclosure.

In the embodiment shown in FIG. 13, the panoramic lens assembly 30c has a longitudinal axis A and includes eight lens elements $L_1$-$L_8$. In addition, a filter F and an image sensor S may be used in conjunction with the panoramic lens assembly 30c.

Figure 14:
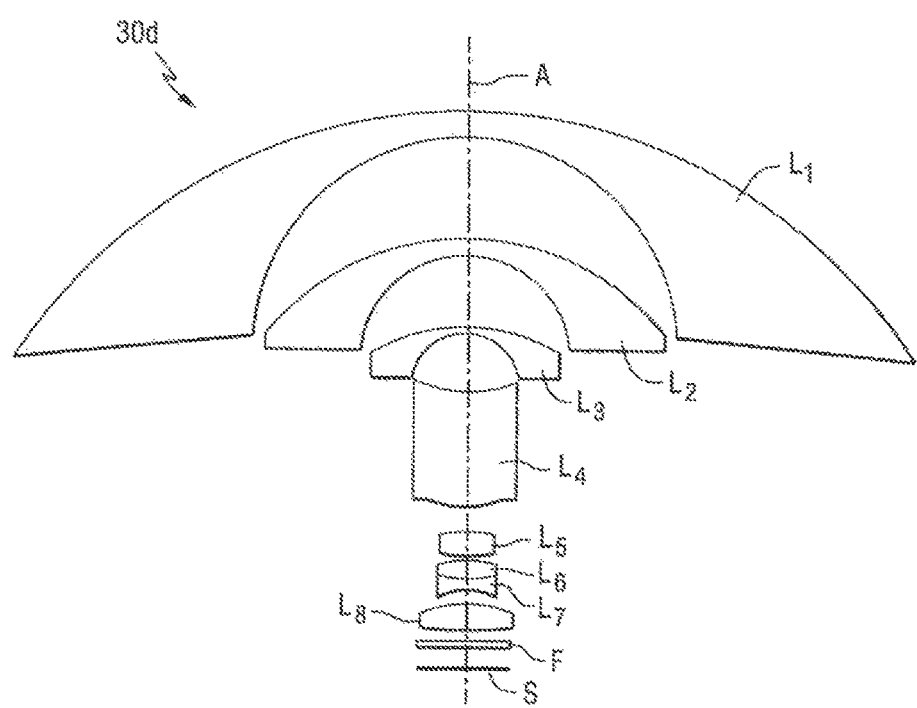
FIG. 14 schematically illustrates yet another exemplary panoramic lens system for use in a panoramic camera module, in accordance with another exemplary embodiment of the present disclosure.

In the embodiment shown in FIG. 14, the panoramic lens assembly 30d has a longitudinal axis A and includes eight lens elements $L_1$-$L_8$. In addition, a filter F and an image sensor S may be used in conjunction with the panoramic lens assembly 30d.

In each of the panoramic lens assemblies 30a-30d shown in FIGS. 11-14, as well as any other type of panoramic lens assembly that may be selected for use in the panoramic camera module 101, the number and shapes of the individual lens elements L may be routinely selected by those skilled in the art. Furthermore, the lens elements L may be made from conventional lens materials, such as glass and plastics known to those skilled in the art.

Figure 15:
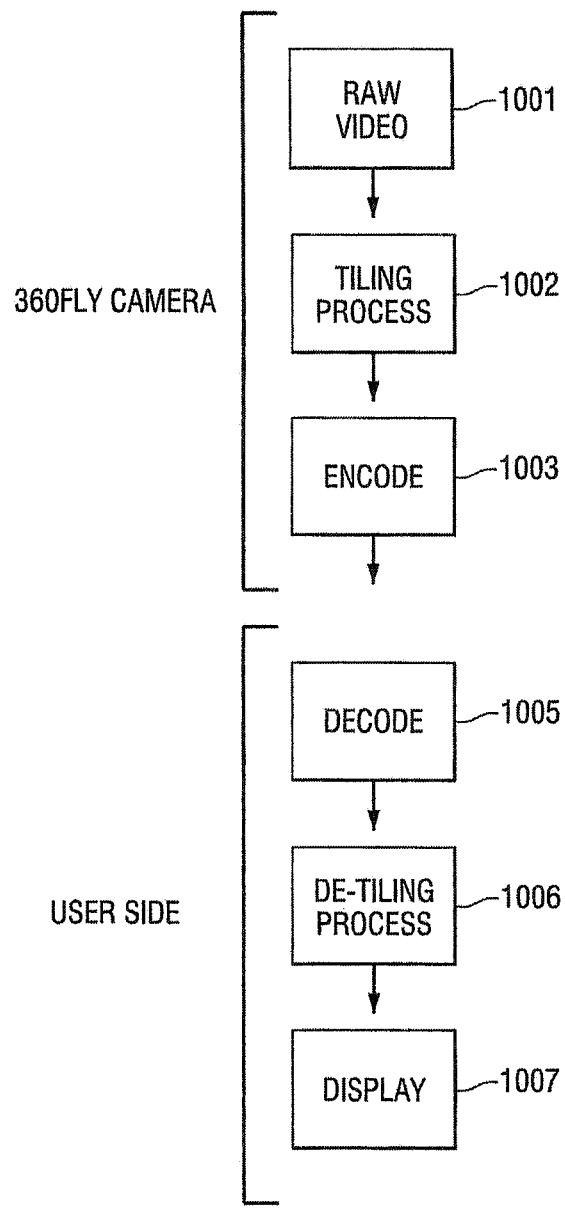
FIG. 15 illustrates a logic flow diagram for processing video or other audiovisual content captured by a camera system, in accordance with another exemplary embodiment of the present disclosure.

FIG. 15 illustrates an example logic flow for processing video or other audiovisual content captured by a device, such as various embodiments of camera systems described herein. Such processing may be performed in the base module 102 and/or in the panoramic camera module 101. Various processing steps described herein may be executed by one or more algorithms or image analysis processes embodied in software, hardware, firmware, or other suitable computer-executable instructions, as well as a variety of programmable appliances or devices. As shown in FIG. 15, from the device perspective, raw video content can be captured at processing step 1001 by a user employing a panoramic camera module. At step 1002, the video content can be tiled, or otherwise subdivided into suitable segments or sub-segments, for encoding at step 1003. The encoding process may include a suitable compression technique or algorithm and/or may be part of a codec process such as one employed in accordance with the H.264 video format, for example, or other similar video compression and decompression standards. From the user perspective, at step 1005 the encoded video content may be communicated to the base module 102 (e.g., a user device such as a smart phone, appliance, or video player), where it is decoded or decompressed for further processing. At step 1006, the decoded video content may be de-tiled and/or stitched together for display at step 1007. In various embodiments, the display may be part of a smart phone, a computer, video editor, video player, and/or another device capable of displaying the video content to the user.

Figure 16:
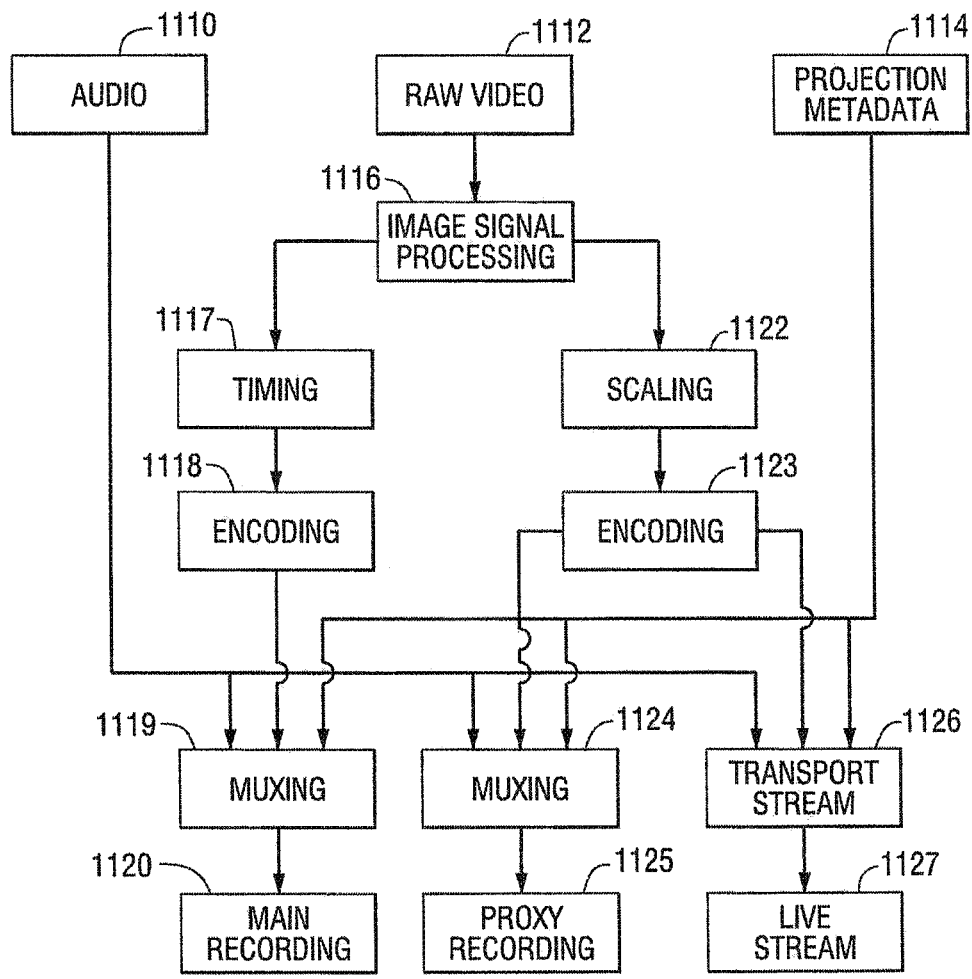
FIG. 16 illustrates a logic block diagram for a camera module to process captured video, audio, and metadata content, in accordance with another exemplary embodiment of the present disclosure.

FIG. 16 illustrates various examples from the camera perspective of processing video, audio, and metadata content captured by a device, which can be structured in accordance with various embodiments of cameras described herein. At step 1110, an audio signal associated with captured content may be processed, which is representative of noise, music, or other audible events captured in the vicinity of the panoramic camera module 101. At step 1112, raw video associated with video content may be collected representing graphical or visual elements captured by the camera. At step 1114, projection metadata may be collected, which comprises motion detection data, for example, or other data which describe the characteristics of the spatial reference system used to geo-reference a video data set to the environment in which the video content was captured. At step 1116, image signal processing of the raw video content (obtained from step 1112) may be performed by applying a timing process to the video content at step 1117, such as to determine and synchronize a frequency for image data presentation or display, and then encoding the image data at step 1118. In certain embodiments, image signal processing of the raw video content (obtained from step 1112) may be performed by scaling certain portions of the content at step 1122, such as by a transformation involving altering one or more of the size dimensions of a portion of image data, and then encoding the image data at step 1123.

At step 1119, the audio data signal from step 1110, the encoded image data from step 1118, and the projection metadata from step 1114 may be multiplexed into a single data file or stream as part of generating a main recording of the captured video content at step 1120. In other embodiments, the audio data signal from step 1110, the encoded image data from step 1123, and the projection metadata from step 1114 may be multiplexed at step 1124 into a single data file or stream as part of generating a proxy recording of the captured video content at step 1125. In certain embodiments, the audio data signal from step 1110, the encoded image data from step 1123, and the projection metadata from step 1114 may be combined into a transport stream at step 1126 as part of generating a live stream of the captured video content at step 1127. It can be appreciated that each of the main recording, proxy recording, and live stream may be generated in association with different processing rates, compression techniques, degrees of quality, or other factors which may depend on a use or application intended for the processed content.

Figure 17:
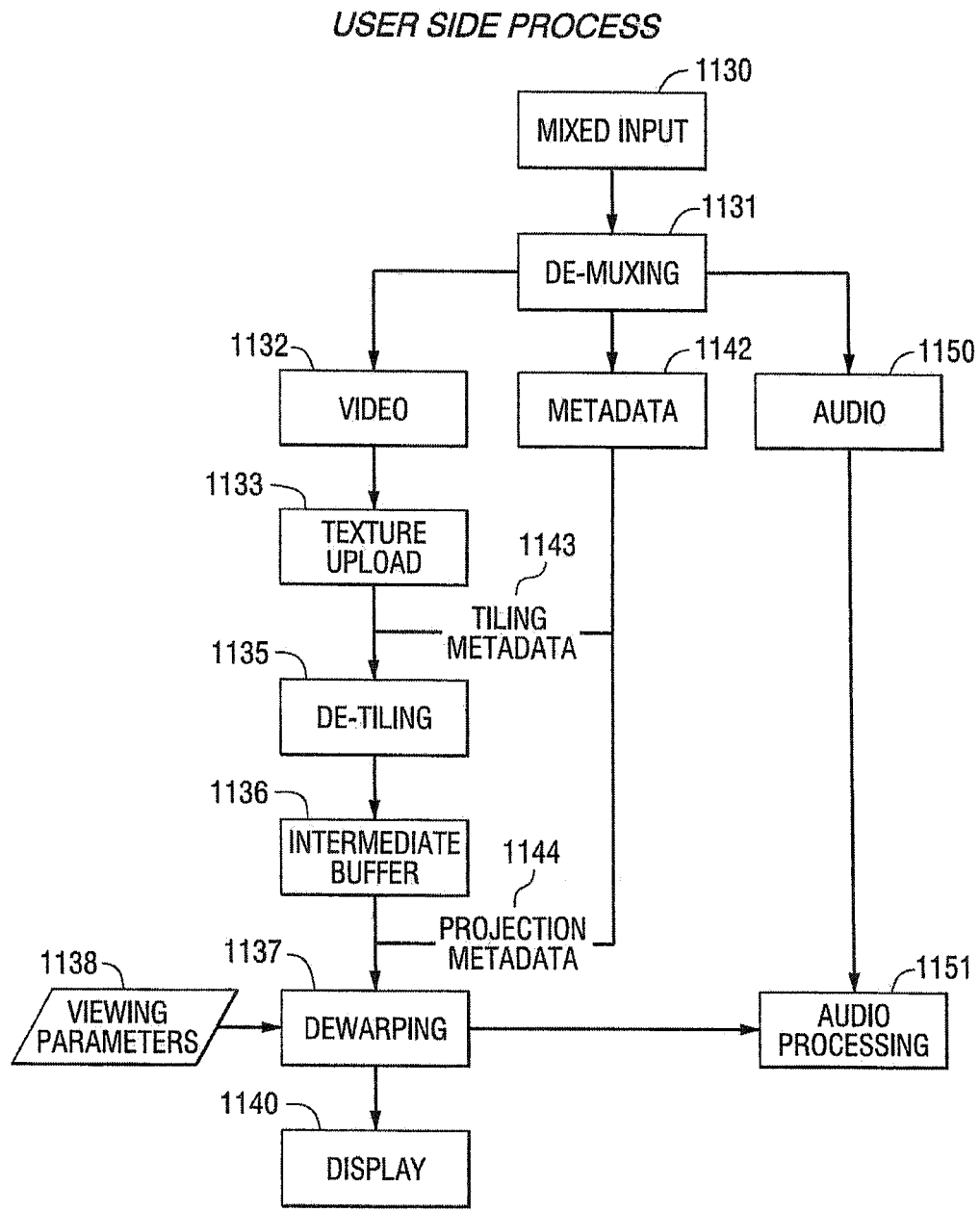
FIG. 17 illustrates various examples from a user perspective for processing video data or image data processed by and/or received from a panoramic camera module, in accordance with another exemplary embodiment of the present disclosure.

FIG. 17 illustrates various examples from the user perspective of processing video data or image data processed by and/or received from a panoramic camera module. Multiplexed input data received at step 1130 may be de-multiplexed or de-muxed at step 1131. The de-multiplexed input data may be separated into its constituent components including video data at step 1132, metadata at step 1142, and audio data at step 1150. A texture upload process may be applied in association with the video data at step 1133 to incorporate data representing the surfaces of various objects displayed in the video data, for example. At step 1143, tiling metadata (as part of the metadata of step 1142) may be processed with the video data, such as in conjunction with executing a de-tiling process at step 1135, for example. At step 1136, an intermediate buffer may be employed to enhance processing efficiency for the video data. At step 1144, projection metadata (as part of the metadata of step 1142) may be processed along with the video data prior to de-warping the video data at step 1137. De-warping the video data may involve addressing optical distortions by remapping portions of image data to optimize the image data for an intended application. De-warping the video data may also involve processing one or more viewing parameters at step 1138, which may be specified by the user based on a desired display appearance or other characteristic of the video data, and/or receiving audio data processed at step 1151. The processed video data may then be displayed at step 1140 on a smart phone, a computer, video editor, video player, virtual reality headset, and/or another device capable of displaying the video content.

Figure 18:
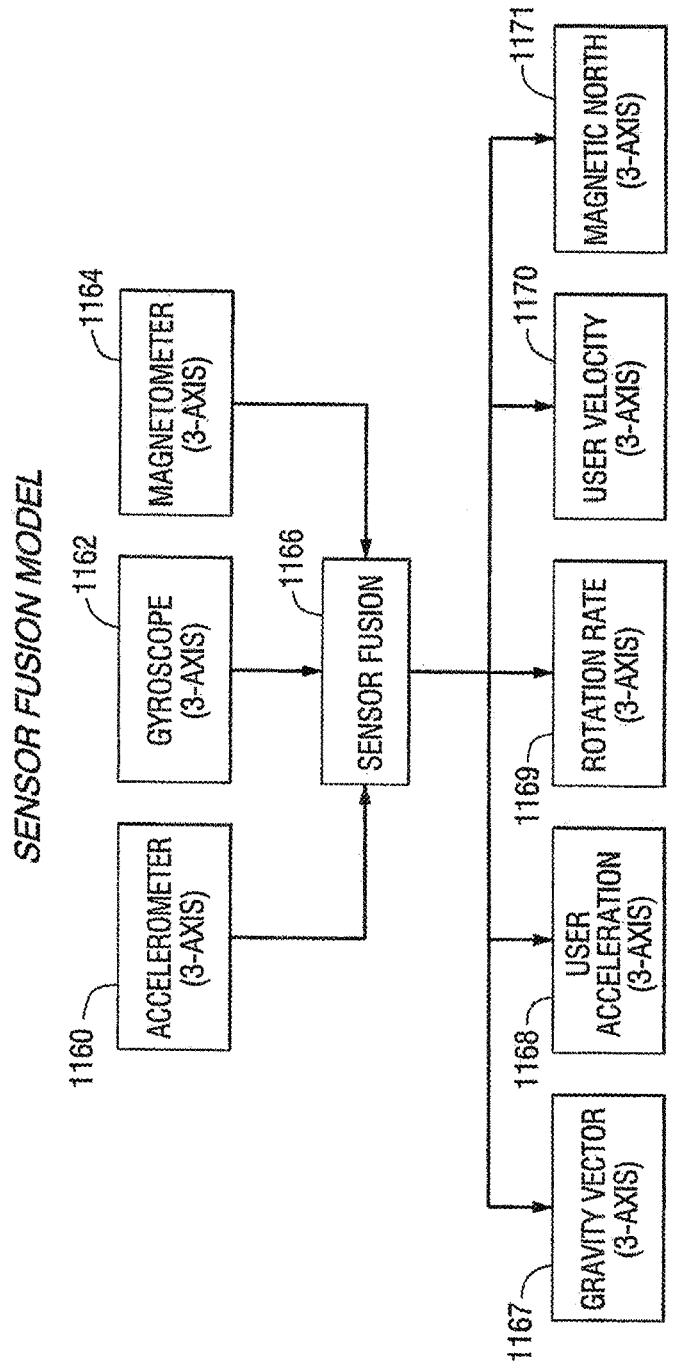
FIG. 18 illustrates an exemplary sensor fusion process, which can be employed in connection with various embodiments of the present disclosure.

FIG. 18 depicts an example of a sensor fusion model which can be employed in connection with various embodiments of the devices and processes described herein. As shown, a sensor fusion process 1166 receives input data from one or more of an accelerometer 1160, a gyroscope 1162, or a magnetometer 1164, each of which may be a three-axis sensor device, for example. Such motion sensor(s) may be located in the panoramic camera module 101 and/or the base module 102. Those skilled in the art can appreciate that multi-axis accelerometers 1160 can be configured to detect magnitude and direction of acceleration as a vector quantity, and can be used to sense orientation (e.g., due to direction of weight changes). The gyroscope 1162 can be used for measuring or maintaining orientation, for example. The magnetometer 1164 may be used to measure the vector components or magnitude of a magnetic field, wherein the vector components of the field may be expressed in terms of declination (e.g., the angle between the horizontal component of the field vector and magnetic north) and the inclination (e.g., the angle between the field vector and the horizontal surface). With the collaboration or fusion of these various sensors 1160, 1162, 1164, one or more of the following data elements can be determined during operation of the camera device: gravity vector 1167, user acceleration 1168, rotation rate 1169, user velocity 1170, and/or magnetic north 1171.

The images from the camera system 100 may be displayed in any suitable manner. For example, a touch screen may be provided to sense touch actions provided by a user. User touch actions and sensor data may be used to select a particular viewing direction, which is then rendered. The device can interactively render the texture mapped video data in combination with the user touch actions and/or the sensor data to produce video for display. The signal processing can be performed by a processor or processing circuitry.

Video images from the camera system 100 may be downloaded to various display devices, such as a smart phone using an app, or any other current or future display device. Many current mobile computing devices, such as commercially available smart phones, contain built-in touch screen or touch screen input sensors that can be used to receive user commands. In usage scenarios where a software platform does not contain a built-in touch or touch screen sensor, externally connected input devices can be used. User input, such as touching, dragging, and pinching, can be detected as touch actions by touch and touch screen sensors though the usage of off the shelf software frameworks.

User input, in the form of touch actions, can be provided to the software application by hardware abstraction frameworks on the software platform. These touch actions enable the software application to provide the user with an interactive presentation of prerecorded media, shared media downloaded or streamed from the internet, or media which is currently being recorded or previewed.

An interactive renderer may combine user input (touch actions), still or motion image data from the camera (via a texture map), and movement data (encoded from geospatial/orientation data) to provide a user-controlled view of prerecorded media, shared media downloaded or streamed over a network, or media currently being recorded or previewed. User input can be used in real time to determine the view orientation and zoom. As used in this description, "real time" means that the display shows images at essentially the same time the images are being sensed by the device (or at a delay that is not obvious to a user) and/or the display shows image changes in response to user input at essentially the same time as the user input is received. By combining the panoramic camera system 100 with a mobile computing device, the internal signal processing bandwidth can be sufficient to achieve the real-time display.

Figure 19:
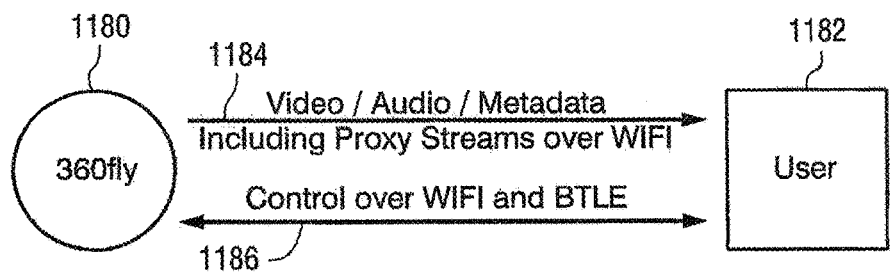
FIG. 19 illustrates an interaction between a camera system and a user of the camera system, in accordance with another exemplary embodiment of the present disclosure.

FIG. 19 illustrates an example interaction between a camera system 1180 and a user 1182 of the camera system 1180. As shown, the user 1182 may receive and process video, audio, and metadata associated with captured video content with a smart phone, computer, video editor, video player, virtual reality headset, and/or another device. As described above, the received data may include a proxy stream which enables subsequent processing or manipulation of the captured content subject to a desired end use or application. In certain embodiments, data may be communicated through a wireless connection (e.g., a Wi-Fi or cellular connection) from the camera system 1180 to a device of the user 1182, and the user 1182 may exercise control over the camera system 1180 through a wireless connection (e.g., Wi-Fi or cellular) or near-field communication (e.g., Bluetooth).

Figure 20:
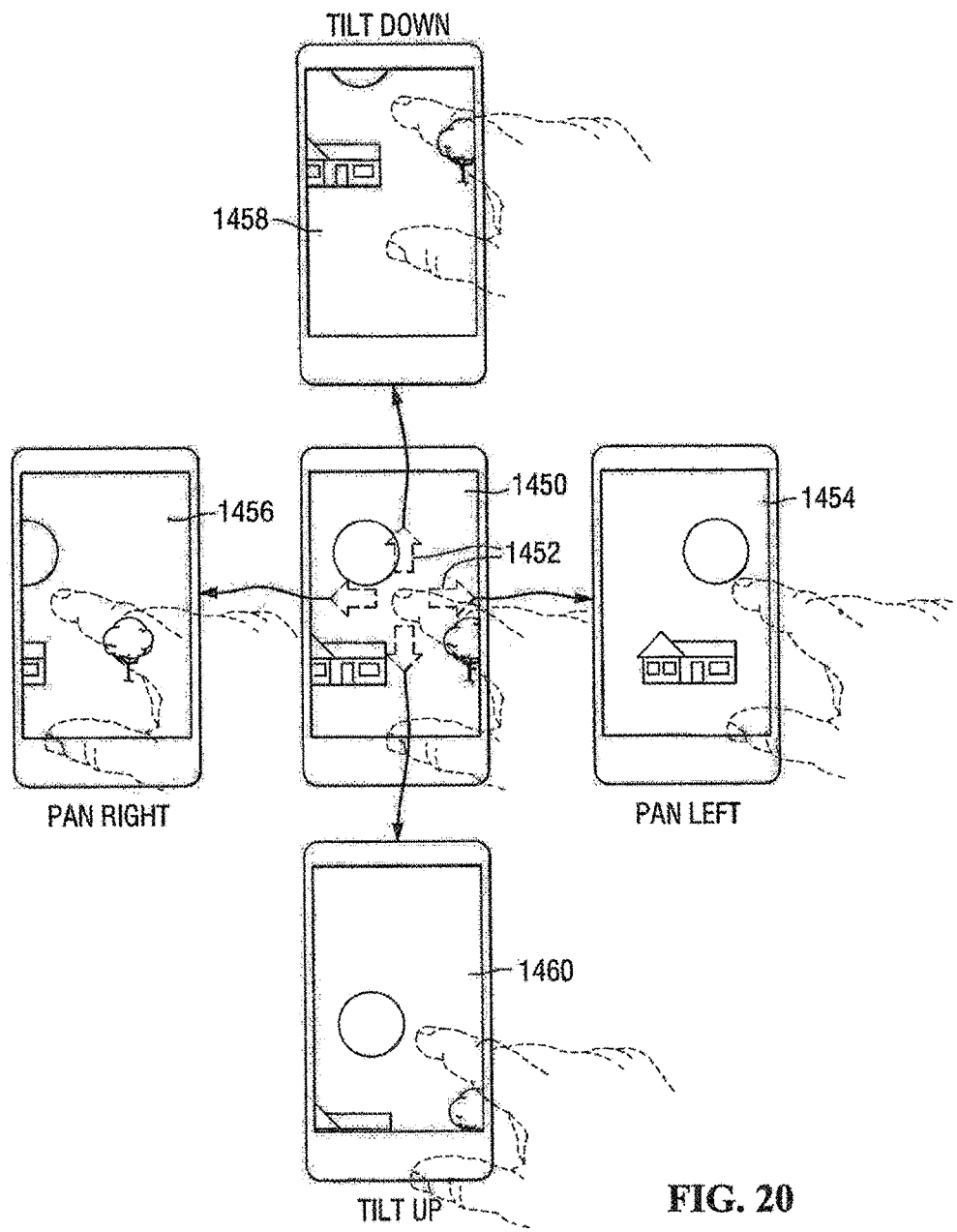
FIG. 20 illustrates pan and tilt functions in response to user commands on a user device, in accordance with another exemplary embodiment of the present disclosure.

FIG. 20 illustrates pan and tilt functions in response to user commands. The mobile computing device includes a touch screen display 1450. A user can touch the screen and move in the directions shown by arrows 1452 to change the displayed image to achieve pan and/or tilt functions. In screen 1454, the image is changed as if the camera field of view is panned to the left. In screen 1456, the image is changed as if the camera field of view is panned to the right. In screen 1458, the image is changed as if the camera is tilted down. In screen 1460, the image is changed as if the camera is tilted up. As shown in FIG. 20, touch-based pan and tilt allows the user to change the viewing region by following single contact drag. The initial point of contact from the user's touch is mapped to a pan/tilt coordinate, and pan/tilt adjustments are computed during dragging to keep that pan/tilt coordinate under the user's finger.

Figure 21:
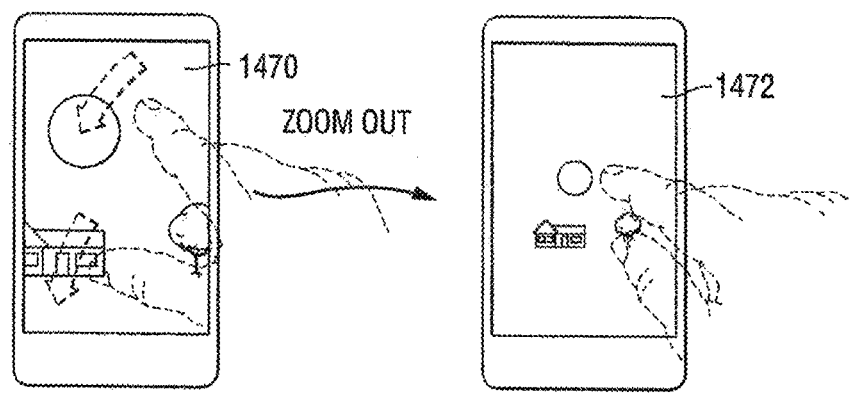
FIG. 21 illustrates a zoom out function in response to user commands on a user device, in accordance with another exemplary embodiment of the present disclosure.
Figure 22:
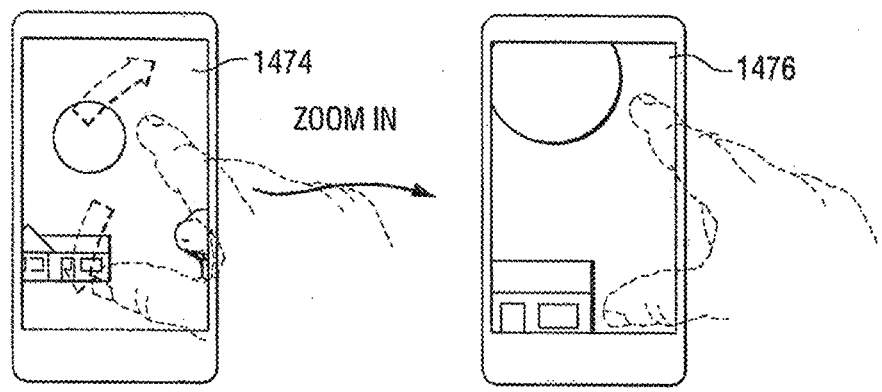
FIG. 22 illustrates a zoom in function in response to user commands on a user device, in accordance with another exemplary embodiment of the present disclosure.

As shown in FIGS. 21 and 22, touch based zoom allows the user to dynamically zoom out or in. Two points of contact from a user touch are mapped to pan/tilt coordinates, from which an angle measure is computed to represent the angle between the two contacting fingers. The viewing field of view (simulating zoom) is adjusted as the user pinches in or out to match the dynamically changing finger positions to the initial angle measure. As shown in FIG. 21, pinching in the two contacting fingers produces a zoom out effect. That is, the object in screen 1470 appears smaller in screen 1472. As shown in FIG. 22, pinching out produces a zoom in effect. That is, the object in screen 1474 appears larger in screen 1476.

Figure 23:
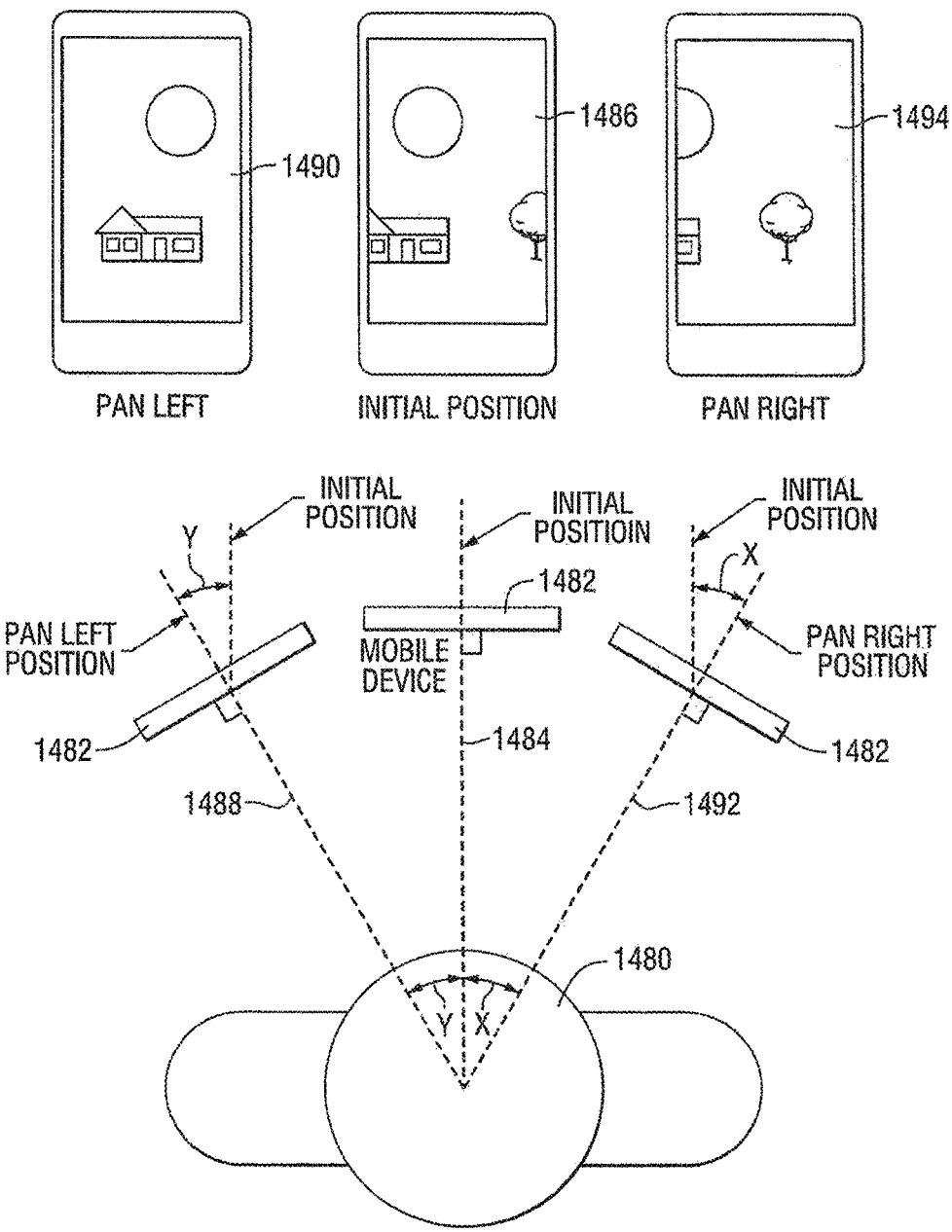
FIG. 23 illustrates an orientation-based pan for an image displayed on a user's mobile computing device, in accordance with another exemplary embodiment of the present disclosure.

FIG. 23 illustrates an orientation-based pan that can be derived from compass data provided by a compass sensor in the computing device, allowing the user to change the displaying pan range by turning the mobile device. This can be accomplished by matching live compass data to recorded compass data in cases where recorded compass data is available. In cases where recorded compass data is not available, an arbitrary north value can be mapped onto the recorded media. When a user 1480 holds the mobile computing device 1482 in an initial position along line 1484, image 1486 is produced on the device display. When a user 1480 moves the mobile computing device 1482 in a pan left position along line 1488, which is offset from the initial position by an angle y, image 1490 is produced on the device display. When a user 1480 moves the mobile computing device 1482 in a pan right position along line 1492, which is offset from the initial position by an angle x, image 1494 is produced on the device display. In effect, the display is showing a different portion of the panoramic image capture by the combination of the camera and the panoramic optical device. The portion of the image to be shown is determined by the change in compass orientation data with respect to the initial position compass data.

Sometimes it is desirable to use an arbitrary north value even when recorded compass data is available. It is also sometimes desirable not to have the pan angle change 1:1 with the device. In some embodiments, the rendered pan angle may change at user-selectable ratio relative to the device. For example, if a user chooses 4× motion controls, then rotating the display device thru 90° will allow the user to see a full rotation of the video, which is convenient when the user does not have the freedom of movement to spin around completely.

In cases where touch-based input is combined with an orientation input, the touch input can be added to the orientation input as an additional offset. By doing so, conflict between the two input methods is avoided effectively.

On mobile devices where gyroscope data is available and offers better performance, gyroscope data which measures changes in rotation along multiple axes over time can be integrated over the time interval between the previous rendered frame and the current frame. This total change in orientation can be added to the orientation used to render the previous frame to determine the new orientation used to render the current frame. In cases where both gyroscope and compass data are available, gyroscope data can be synchronized to compass positions periodically or as a one-time initial offset.

Figure 24:
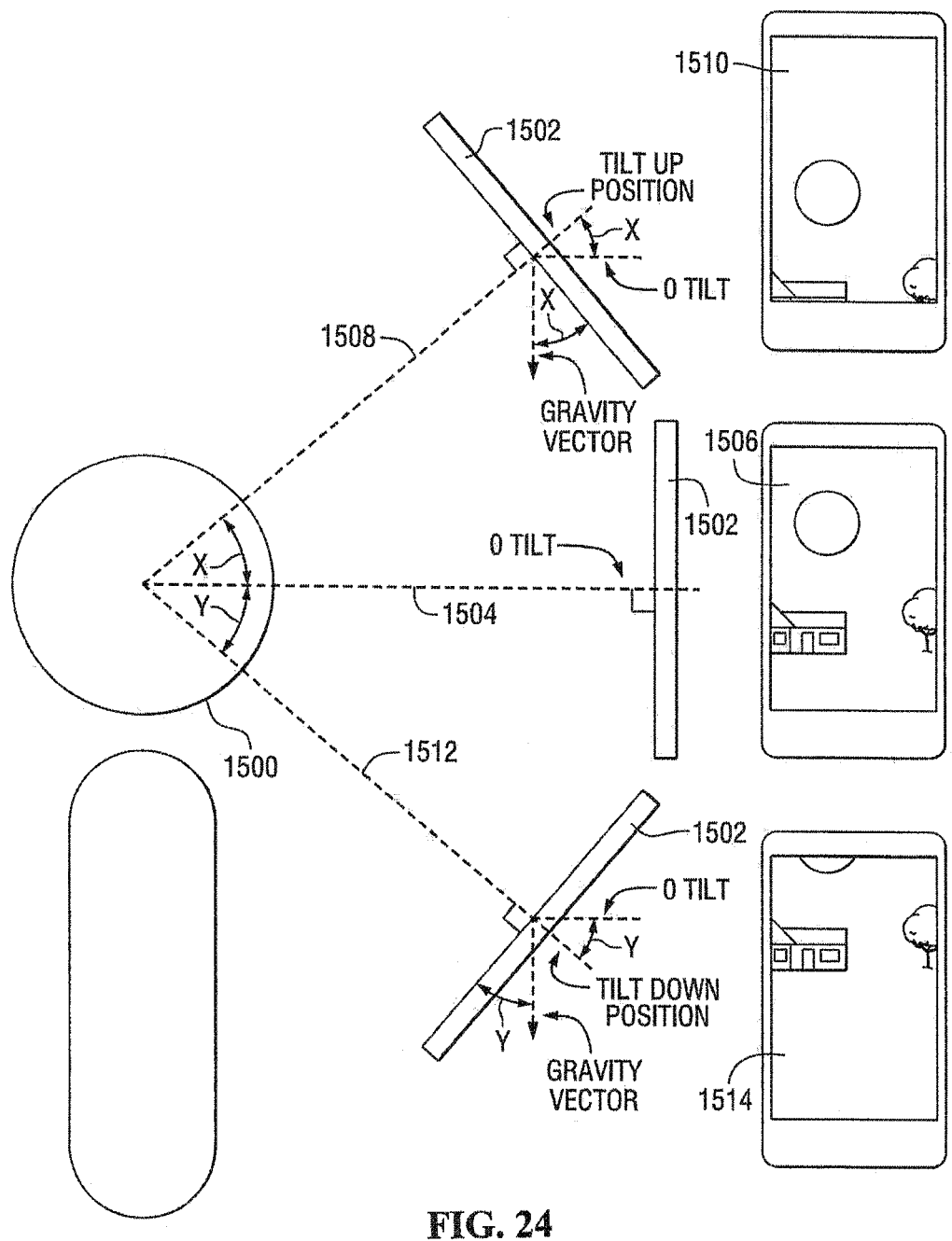
FIG. 24 illustrates an orientation-based tilt for an image displayed on a user's mobile computing device, in accordance with another exemplary embodiment of the present disclosure.

As shown in FIG. 24, orientation based tilt can be derived from accelerometer data, allowing the user to change the displaying tilt range by tilting the mobile device. This can be accomplished by computing the live gravity vector relative to the mobile device. The angle of the gravity vector in relation to the device along the device's display plane will match the tilt angle of the device. This tilt data can be mapped against tilt data in the recorded media. In cases where recorded tilt data is not available, an arbitrary horizon value can be mapped onto the recorded media. The tilt of the device may be used to either directly specify the tilt angle for rendering (i.e., holding the mobile computing device vertically will center the view on the horizon), or it may be used with an arbitrary offset for the convenience of the operator. This offset may be determined based on the initial orientation of the device when playback begins (e.g., the angular position of the mobile computing device when playback is started can be centered on the horizon). When a user 1500 holds the mobile computing device 1502 in an initial position along line 1504, image 1506 is produced on the device display. When a user 1500 moves the mobile computing device 1502 in a tilt up position along line 1508, which is offset from the gravity vector by an angle x, image 1510 is produced on the device display. When a user 1500 moves the mobile computing device 1502 in a tilt down position along line 1512, which is offset from the gravity by an angle y, image 1514 is produced on the device display. In effect, the display is showing a different portion of the panoramic image captured by the combination of the camera and the panoramic optical device. The portion of the image to be shown is determined by the change in vertical orientation data with respect to the initial position compass data.

Figure 25:
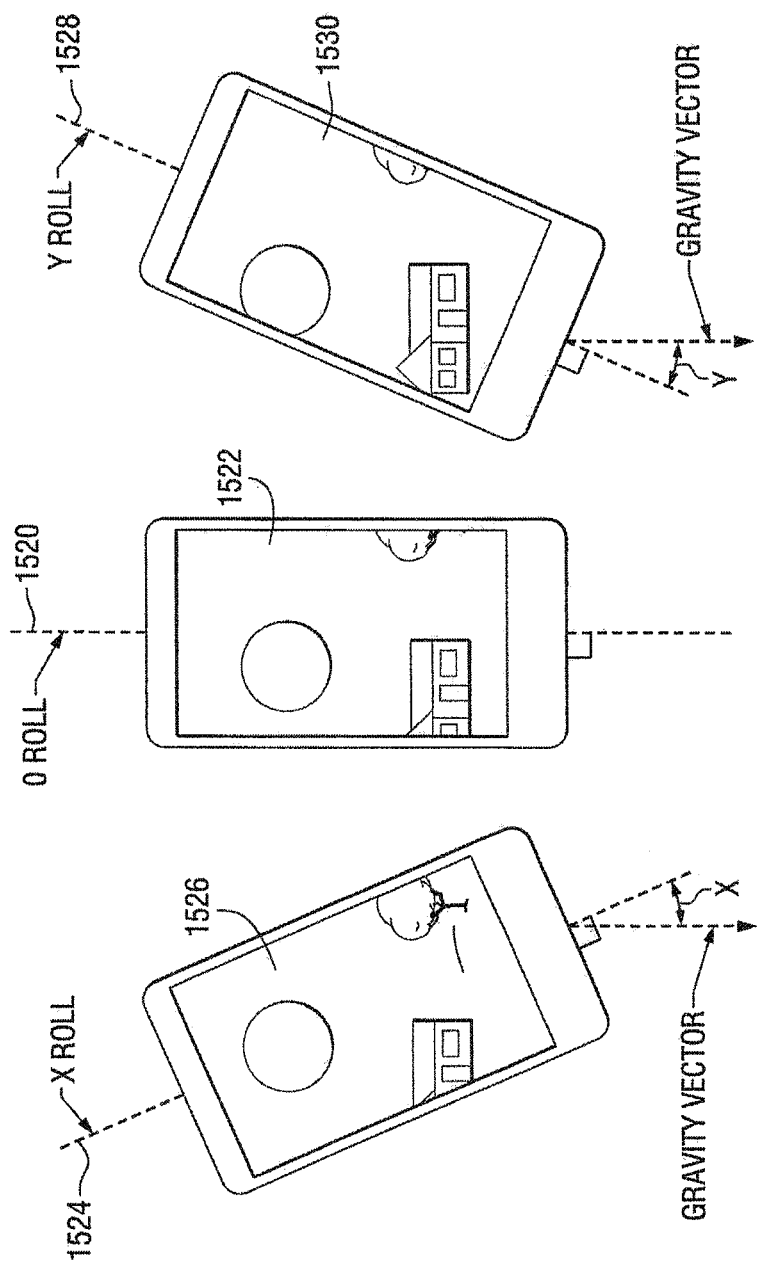
FIG. 25 illustrates automatic roll correction for an image displayed on a user's mobile computing device, in accordance with another exemplary embodiment of the present disclosure.

As shown in FIG. 25, automatic roll correction can be computed as the angle between the device's vertical display axis and the gravity vector from the device's accelerometer. When a user holds the mobile computing device in an initial position along line 1520, image 1522 is produced on the device display. When a user moves the mobile computing device to an x-roll position along line 1524, which is offset from the gravity vector by an angle x, image 1526 is produced on the device display. When a user moves the mobile computing device in a y-roll position along line 1528, which is offset from the gravity by an angle y, image 1530 is produced on the device display. In effect, the display is showing a tilted portion of the panoramic image captured by the combination of the camera and the panoramic optical device. The portion of the image to be shown is determined by the change in vertical orientation data with respect to the initial gravity vector.

The user can select from live view from the camera, videos stored on the device, view content on the user (full resolution for locally stored video or reduced resolution video for web streaming), and interpret/re-interpret sensor data. Proxy streams may be used to preview a video from the camera system on the user side and are transferred at a reduced image quality to the user to enable the recording of edit points. The edit points may then be transferred and applied to the higher resolution video stored on the camera. The high-resolution edit is then available for transmission, which increases efficiency and may be an optimum method for manipulating the video files.

The camera system 100 of the present invention may be used with various apps. For example, an app can search for any nearby camera system and prompt the user with any devices it locates. Once a camera system has been discovered, a name may be created for that camera. If desired, a password may be entered for the camera Wi-Fi network also. The password may be used to connect a mobile device directly to the camera via Wi-Fi when no Wi-Fi network is available. The app may then prompt for a Wi-Fi password. If the mobile device is connected to a Wi-Fi network, that password may be entered to connect both devices to the same network.

The app may enable navigation to a "cameras" section, where the camera to be connected to Wi-Fi in the list of devices may be tapped on to have the app discover it. The camera may be discovered once the app displays a Bluetooth icon for that device. Other icons for that device may also appear (e.g., LED status, battery level and an icon that controls the settings for the device). With the camera discovered, the name of the camera can be tapped to display the network settings for that camera. Once the network settings page for the camera is open, the name of the wireless network in the SSID field may be verified to be the network that the mobile device is connected on. An option under "security" may be set to match the network's settings and the network password may be entered. Note some Wi-Fi networks will not require these steps. The "cameras" icon may be tapped to return to the list of available cameras. When a camera has connected to the Wi-Fi network, a thumbnail preview for the camera may appear along with options for using a live viewfinder or viewing content stored on the camera.

In situations where no external Wi-Fi network is available, the app may be used to navigate to the "cameras" section, where the camera to which to connect may be provided in a list of devices. The camera's name may be tapped on to have the app discover it. The camera may be discovered once the app displays a Bluetooth icon for that device. Other icons for that device may also appear (e.g., LED status, battery level and an icon that controls the settings for the device). An icon may be tapped on to verify that Wi-Fi is enabled on the camera. Wi-Fi settings for the mobile device may be addressed in order to locate the camera in the list of available networks. That network may then be connected. The user may then switch back to the app and tap "cameras" to return to the list of available cameras. When the camera and the app have connected, a thumbnail preview for the camera may appear along with options for using a live viewfinder or viewing content stored on the camera.

In certain embodiments, video can be captured without a mobile device. To start capturing video, the camera system may be turned on by pushing the power button. Video capture can be stopped by pressing the power button again.

In other embodiments, video may be captured with the use of a mobile device paired with the camera. The camera may be powered on, paired with the mobile device and ready to record. The "cameras" button may be tapped, followed by tapping "viewfinder." This will bring up a live view from the camera. A record button on the screen may be tapped to start recording. To stop video capture, the record button on the screen may be tapped to stop recording.

To playback and interact with a chosen video, a play icon may be tapped. The user may drag a finger around on the screen to change the viewing angle of the shot. The video may continue to playback while the perspective of the video changes. Tapping or scrubbing on the video timeline may be used to skip around throughout the video.

Firmware may be used to support real-time video and audio output (e.g., via USB), allowing the camera to act as a live web-cam when connected to a PC. Recorded content may be stored using standard DCIM folder configurations. A YOUTUBE mode may be provided using a dedicated firmware setting that allows for "YouTube Ready" video capture including metadata overlay for direct upload to YOUTUBE. Accelerometer activated recording may be used. A camera setting may allow for automatic launch of recording sessions when the camera senses motion and/or sound. Built-in accelerometer, altimeter, barometer, and GPS sensors may provide the camera with the ability to produce companion data files in .csv format. Time-lapse, photo, and burst modes may be provided. The camera may also support connectivity to remote BLUETOOTH microphones for enhanced audio recording capabilities.

The panoramic camera system 100 of the present invention has many uses. The camera may be mounted on any support structure, such as a person or object (either stationary or mobile). For example, the camera system 100 may be worn by a user to record the user's activities in a panoramic format (e.g., sporting activities and the like). Examples of some other possible applications and uses of the system in accordance with embodiments of the present invention include: motion tracking; social networking; 360° mapping and touring; security and surveillance; and military applications.

For motion tracking, the processing software can be written to detect and track the motion of subjects of interest (people, vehicles, etc.) and display views following these subjects of interest.

For social networking and entertainment or sporting events, the processing software may provide multiple viewing perspectives of a single live event from multiple devices. Using geo-positioning data, software can display media from other devices within close proximity at either the current or a previous time. Individual devices can be used for n-way sharing of personal media (much like YOUTUBE or FLICKR). Some examples of events include concerts and sporting events, where users of multiple devices can upload their respective video data (for example, images taken from the user's location in a venue), and the various users can select desired viewing positions for viewing images in the video data. Software can also be provided for using the apparatus for teleconferencing in a one-way (presentation style—one or two-way audio communication and one-way video transmission), two-way (conference room to conference room), or n-way configuration (multiple conference rooms or conferencing environments).

For 360° mapping and touring, the processing software can be written to perform 360° mapping of streets, buildings, and scenes using geospatial data and multiple perspectives supplied over time by one or more devices and users. The apparatus can be mounted on ground or air vehicles as well, or used in conjunction with autonomous/semi-autonomous drones. Resulting video media can be replayed as captured to provide virtual tours along street routes, building interiors, or flying tours. Resulting video media can also be replayed as individual frames, based on user requested locations, to provide arbitrary 360° tours (frame merging and interpolation techniques can be applied to ease the transition between frames in different videos, or to remove temporary fixtures, vehicles, and persons from the displayed frames).

For security and surveillance, the apparatus can be mounted in portable and stationary installations, serving as low profile security cameras, traffic cameras, or police vehicle cameras. One or more devices can also be used at crime scenes to gather forensic evidence in 360° fields of view. The optic can be paired with a ruggedized recording device to serve as part of a video black box in a variety of vehicles; mounted either internally, externally, or both to simultaneously provide video data for some predetermined length of time leading up to an incident.

For military applications, man-portable and vehicle mounted systems can be used for muzzle flash detection, to rapidly determine the location of hostile forces. Multiple devices can be used within a single area of operation to provide multiple perspectives of multiple targets or locations of interest. When mounted as a man-portable system, the apparatus can be used to provide its user with better situational awareness of his or her immediate surroundings. When mounted as a fixed installation, the apparatus can be used for remote surveillance, with the majority of the apparatus concealed or camouflaged. The apparatus can be constructed to accommodate cameras in non-visible light spectrums, such as infrared for 360° heat detection.

Whereas particular embodiments of this invention have been described above for purposes of illustration, it will be evident to those skilled in the art that numerous variations of the details of the present invention may be made without departing from the invention.

What is claimed is:

1. An apparel-mounted panoramic camera system comprising:
   an item of apparel;
   a panoramic camera module that includes:
     a panoramic lens having a longitudinal axis defining a 360° rotational view,
     an image sensor positioned below the panoramic lens,
     a first processor coupled to the image sensor and operable to process image data received from the image sensor,
     a first wireless communication transceiver coupled to the processor and operable to transmit processed image data provided by the first processor, and
     a first battery that supplies power to at least the image sensor, the first processor, and the first wireless communication transceiver;
   a base module that includes:
     a second wireless communication transceiver operable to receive the processed image data from the first wireless communication transceiver,
     a second processor coupled to the second wireless communication transceiver and operable to further process the processed image data received by the second wireless communication transceiver, and
     a second battery that supplies power to at least the second processor and the second wireless communication transceiver; and a mounting apparatus attaching the panoramic camera module to the item of apparel such that the panoramic camera module is in a fixed position on the item of apparel and the longitudinal axis of the panoramic lens is tilted from a desired direction by a non-zero tilt angle, wherein the non-zero tilt angle accounts for tilting of the item of apparel during normal use such that the longitudinal axis of the panoramic lens becomes aligned or nearly aligned with the desired direction when the item of apparel is used.

2. The apparel-mounted panoramic camera system of claim 1, wherein the desired direction is vertical.

3. The apparel-mounted panoramic camera system of claim 1, wherein the base module is a smart phone.

4. The apparel-mounted panoramic camera system of claim 1, wherein the first processor receives raw image data from the image sensor, performs a tiling process on the raw image data to produce tiled image data, encodes the tiled image data, and provides the encoded tiled image data to the first wireless communication transceiver for transmission to the second wireless communication transceiver.

5. The apparel-mounted panoramic camera system of claim 4, wherein the second processor receives the encoded tiled image data, decodes the encoded tiled image data to produce the tiled image data, de-tiles the tiled image data to produce the raw image data, and formats the raw image data for presentation on a display.

6. The apparel-mounted panoramic camera system of claim 1, wherein the panoramic camera module further includes one or more motion sensors coupled to the first processor.

7. The apparel-mounted panoramic camera system of claim 1, wherein the panoramic lens comprises a stacked lens assembly and a filter, wherein the filter is positioned between the stacked lens assembly and the image sensor.

8. An apparel-mounted panoramic camera system comprising:
an item of apparel;
a first panoramic camera module that includes:
a first panoramic lens having a first longitudinal axis defining a 360° rotational view,
a first image sensor positioned below the first panoramic lens,
a first processor coupled to the first image sensor and operable to process image data received from the first image sensor, and
a first battery that supplies power to at least the first image sensor and the first processor;
a second panoramic camera module positioned in a direction opposite to the first panoramic camera module, the second panoramic camera module including:
a second panoramic lens having a second longitudinal axis defining a 360° rotational view, the second panoramic camera module being positioned in relation to the first panoramic camera module such that the first longitudinal axis and the second longitudinal axis are substantially aligned,
a second image sensor positioned below the second panoramic lens,
a second processor coupled to the second image sensor and operable to process image data received from the second image sensor, and
a second battery that supplies power to at least the second image sensor and the second processor;
a first wireless communication transceiver coupled to the first processor and the second processor, and operable to transmit processed image data provided by the first processor and the second processor;
a base module that includes:
a second wireless communication transceiver operable to receive the processed image data from the first wireless communication transceiver,
a third processor coupled to the second wireless communication transceiver and operable to further process the processed image data received by the second wireless communication transceiver, and
a second battery that supplies power to at least the third processor and the second wireless communication transceiver; and
a mounting apparatus attaching the first panoramic camera module and the second panoramic camera module to the item of apparel such that the first and second panoramic camera modules are in fixed positions on the item of apparel and the substantially-aligned longitudinal axes of the first panoramic lens and the second panoramic lens are tilted from a desired direction by a non-zero tilt angle, wherein the non-zero tilt angle accounts for tilting of the item of apparel during normal use such that the substantially-aligned longitudinal axes of the first panoramic lens and the second panoramic lens become aligned or nearly aligned with the desired direction when the item of apparel is used.

9. The apparel-mounted panoramic camera system of claim 8, wherein the desired direction is horizontal.

10. The apparel-mounted panoramic camera system of claim 8, wherein the first processor receives first raw image data from the first image sensor, performs a tiling process on the first raw image data to produce first tiled image data, encodes the first tiled image data, and provides the encoded first tiled image data to the first wireless communication transceiver for transmission to the second wireless communication transceiver; and
wherein the second processor receives second raw image data from the second image sensor, performs a tiling process on the second raw image data to produce second tiled image data, encodes the second tiled image data, and provides the encoded second tiled image data to the first wireless communication transceiver for transmission to the second wireless communication transceiver.

11. The apparel-mounted panoramic camera system of claim 10, wherein the third processor receives the encoded first tiled image data and the encoded second tiled image data, decodes the encoded first tiled image data and the encoded second tiled image data to produce the first tiled image data and the second tiled image data, de-tiles the first tiled image data and the second tiled image data to produce the first raw image data and the second raw image data, stitches the first raw image data and the second raw image data together to form a full 360°×360° field of view, and formats the stitched raw image data for presentation on a display.

12. The apparel-mounted panoramic camera system of claim 1, wherein the desired direction is horizontal.

13. An apparel-mounted panoramic camera system comprising:
an item of apparel;
a panoramic camera module that includes:
a panoramic lens having a longitudinal axis defining a 360° rotational view,
an image sensor positioned below the panoramic lens,
a processor coupled to the image sensor and operable to process image data received from the image sensor, a wireless communication transceiver coupled to the processor and operable to transmit processed image data provided by the processor, and a battery that supplies power to at least the image sensor, the processor, and the wireless communication transceiver; and a mounting apparatus attaching the panoramic camera module to the item of apparel such that the panoramic camera module is in a fixed position on the item of apparel and the longitudinal axis of the panoramic lens is tilted from a desired direction by a non-zero tilt angle, wherein the non-zero tilt angle accounts for tilting of the item of apparel during normal use such that the longitudinal axis of the panoramic lens becomes aligned or nearly aligned with the desired direction when the item of apparel is used.

14. The apparel-mounted panoramic camera system of claim 13, wherein the desired direction is vertical.

15. The apparel-mounted panoramic camera system of claim 13, wherein the desired direction is horizontal.

16. An apparel-mounted panoramic camera system comprising:

an item of apparel;

a first panoramic camera module that includes:

a first panoramic lens having a first longitudinal axis defining a 360° rotational view, a first image sensor positioned below the first panoramic lens, a first processor coupled to the first image sensor and operable to process image data received from the first image sensor, and a first battery that supplies power to at least the first image sensor and the first processor;

a second panoramic camera module positioned in a direction opposite to the first panoramic camera module, the second panoramic camera module including:

a second panoramic lens having a second longitudinal axis defining a 360° rotational view, the second panoramic camera module being positioned in relation to the first panoramic camera module such that the first longitudinal axis and the second longitudinal axis are substantially aligned, a second image sensor positioned below the second panoramic lens, a second processor coupled to the second image sensor and operable to process image data received from the second image sensor, and a second battery that supplies power to at least the second image sensor and the second processor;

a wireless communication transceiver coupled to the first processor and the second processor, and operable to transmit processed image data provided by the first processor and the second processor; and a mounting apparatus attaching the first panoramic camera module and the second panoramic camera module to the item of apparel such that the first and second panoramic camera modules are in fixed positions on the item of apparel and the substantially-aligned longitudinal axes of the first panoramic lens and the second panoramic lens are tilted from a desired direction by a non-zero tilt angle, wherein the non-zero tilt angle accounts for tilting of the item of apparel during normal use such that the substantially-aligned longitudinal axes of the first panoramic lens and the second panoramic lens become aligned or nearly aligned with the desired direction when the item of apparel is used.

17. The apparel-mounted panoramic camera system of claim 16, wherein the desired direction is horizontal.

* * * * *

UNITED STATES PATENT AND TRADEMARK OFFICE
CERTIFICATE OF CORRECTION

PATENT NO. : 9,939,843 B2
APPLICATION NO. : 15/398031
DATED : April 10, 2018
INVENTOR(S) : Michael Rondinelli and Bradley A. Simon Page 1 of 1

It is certified that error appears in the above-identified patent and that said Letters Patent is hereby corrected as shown below:

In the Drawings

Reference numeral "100" is added to FIG. 1 such that the reference numeral points generally to the camera system illustrated in the figure.

In FIG. 1, the text "camera/lens module" is replaced with "101.".

In FIG. 1, the text "base module" is replaced with "102.".

In the Specification

In Column 9, Line 50, reference numeral "10" is replaced with "100.".

Signed and Sealed this
Twenty-fourth Day of July, 2018

Andrei Iancu
*Director of the United States Patent and Trademark Office*